(12) United States Patent
Nagata et al.

(10) Patent No.: US 7,616,589 B2
(45) Date of Patent: Nov. 10, 2009

(54) VIRTUAL LAN CREATION DEVICE

(75) Inventors: Akira Nagata, Kawasaki (JP); Akira Chugo, Kawasaki (JP); Keiji Miyazaki, Kawasaki (JP); Hitoshi Ueno, Kawasaki (JP); Kiyoshi Sugita, Kawasaki (JP); Takashi Onodera, Kawasaki (JP); Masahiko Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 680 days.

(21) Appl. No.: 11/062,234

(22) Filed: Feb. 18, 2005

(65) Prior Publication Data

US 2005/0152289 A1     Jul. 14, 2005

Related U.S. Application Data

(63) Continuation of application No. PCT/JP03/01797, filed on Feb. 19, 2003.

(51) Int. Cl.
  *H04L 12/28*   (2006.01)
  *H04L 12/56*   (2006.01)
  *G06F 15/16*   (2006.01)

(52) U.S. Cl. .................. 370/256; 370/408; 709/252
(58) Field of Classification Search .................. None
  See application file for complete search history.

(56) References Cited

U.S. PATENT DOCUMENTS

| | | | | |
|---|---|---|---|---|
| 6,912,221 B1* | 6/2005 | Zadikian et al. | ........ | 370/395.21 |
| 7,061,876 B2* | 6/2006 | Ambe | ........ | 370/256 |
| 2002/0101875 A1* | 8/2002 | Lui et al. | ........ | 370/402 |
| 2002/0167898 A1* | 11/2002 | Thang et al. | ........ | 370/216 |
| 2003/0095509 A1* | 5/2003 | Ramanan et al. | ........ | 370/256 |
| 2003/0120763 A1* | 6/2003 | Volpano | ........ | 709/223 |
| 2004/0103275 A1* | 5/2004 | Ji et al. | ........ | 713/150 |

FOREIGN PATENT DOCUMENTS

| | | |
|---|---|---|
| EP | 0 740 441 | 10/1996 |
| JP | 9-51342 | 2/1997 |
| JP | 2001-268104 | 9/2001 |
| JP | 2002-204247 | 7/2002 |
| JP | 2002-314573 | 10/2002 |

OTHER PUBLICATIONS

International Search Report dated Jun. 3, 2003.
Draft Standard for Local and Metropolitan Area Networks-Amendment 3 to 802.1Q Virtual Bridged Local Area Networks: Multiple Spanning Trees. Institute of Electrical and Electronics Engineers, Inc.
Bernard M. Waxman. Routing of Multipoint Connections. IEEE Journal on Selected Areas in Communications vol. 6 No. 9 Dec. 1998 1617-1622.
Akira Nagata, et al. VLAN Design Algorithm for Transparent LAN Service with MSTP. Technical Report of IEICE.

* cited by examiner

*Primary Examiner*—Pankaj Kumar
*Assistant Examiner*—Hicham B Foud
(74) *Attorney, Agent, or Firm*—Katten Muchin Rosenman LLP

(57) ABSTRACT

A spanning tree creation unit creates a plurality of spanning trees based on the network topology, and registers the spanning trees to a spanning tree information table. A spanning tree selection unit selects a spanning tree wherein communication resources will be used most effectively, out of the plurality of spanning trees registered to the spanning tree information table. A node setup unit sets the mapping information which expresses correspondence between the requested virtual LAN and the selected spanning tree in each node.

19 Claims, 40 Drawing Sheets

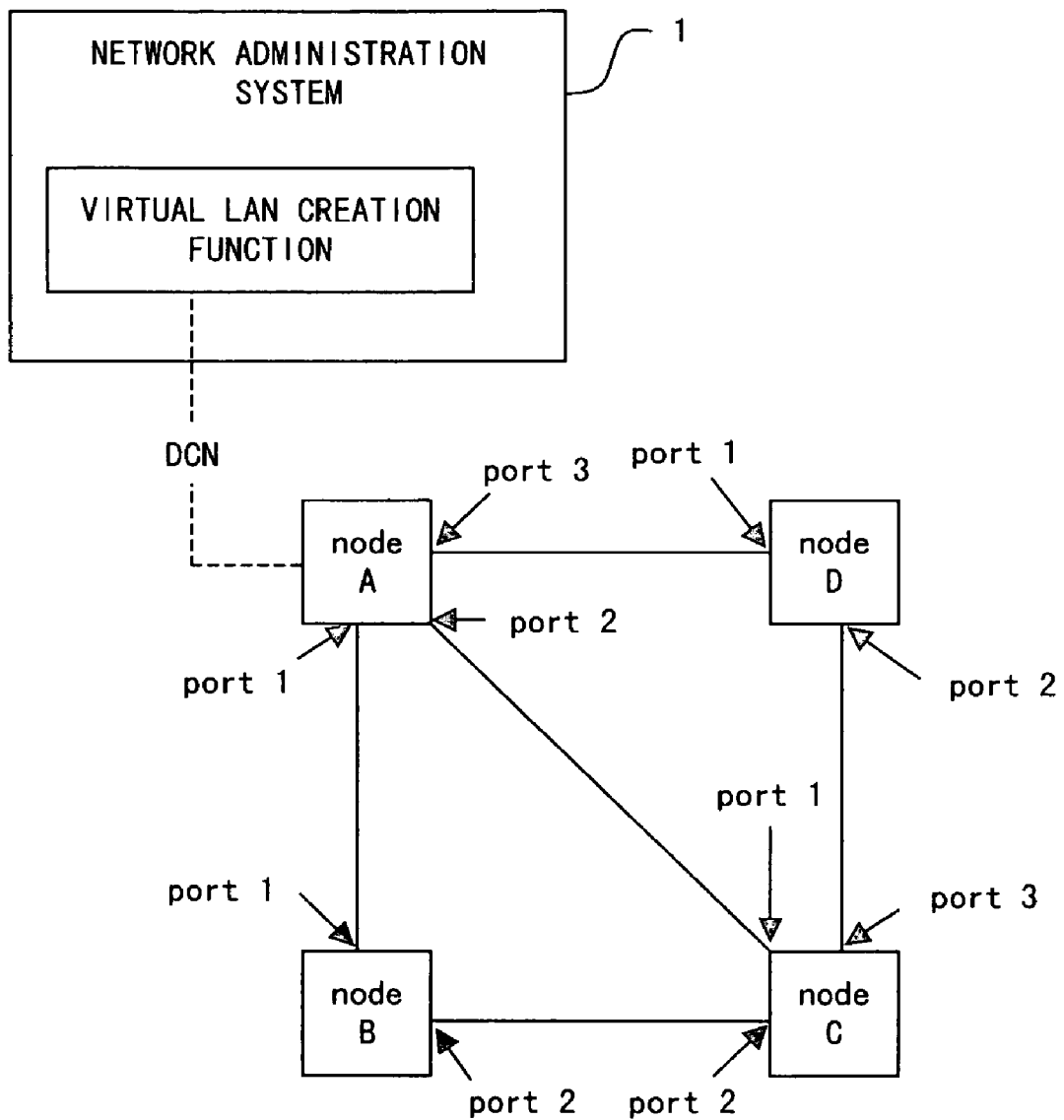
F I G. 1

| Node | Next | Cost |
|------|------|------|
| A | B | 10 |
| A | C | 10 |
| A | D | 10 |
| B | C | 10 |
| C | D | 30 |

F I G. 3

BEFORE SPANNING TREE CREATION

| MST ID | Node | Next |
|--------|------|------|
| -- | -- | -- |

FIG. 4A

BEFORE SPANNING TREE CREATION

| Node | PRIORITY LEVEL |
|------|----------------|
| -- | -- |

FIG. 4B

| MST ID | Node | Next |
|---|---|---|
| 1 | A | B |
| 1 | A | D |
| 1 | A | C |

FIG. 5A

| Node | PRIORITY LEVEL |
|---|---|
| A | 1 |
| B | 10 |
| C | 10 |
| D | 10 |

FIG. 5B

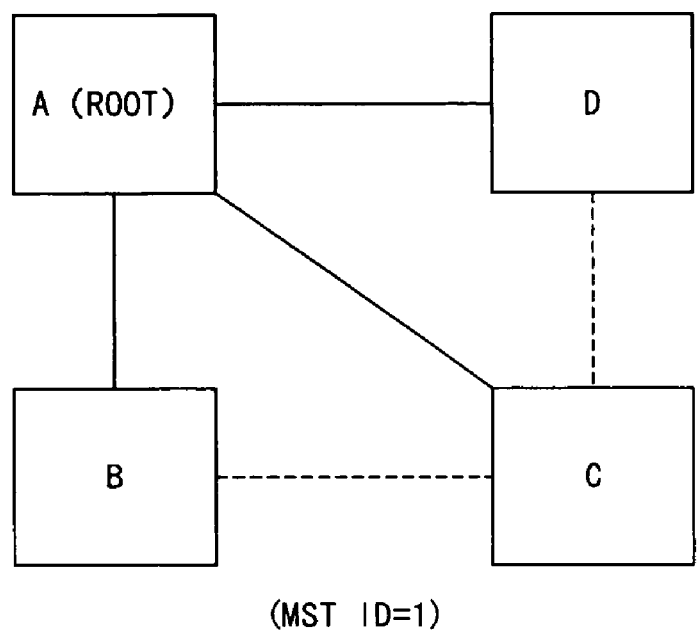
(MST ID=1)
F I G. 6 A
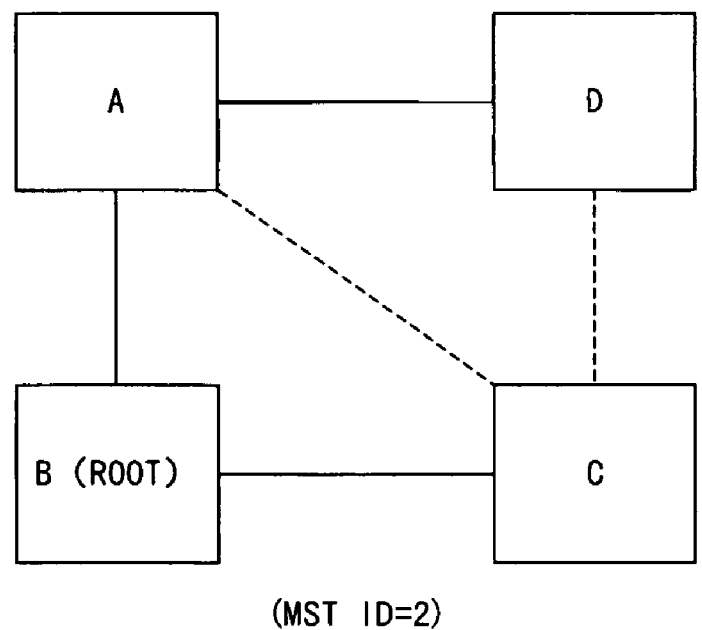
(MST ID=2)
F I G. 6 B

| MST ID | Node | Next |
|---|---|---|
| 1 | A | B |
| 1 | A | D |
| 1 | A | C |
| 2 | A | B |
| 2 | A | D |
| 2 | B | C |

FIG. 7A

| Node | PRIORITY LEVEL |
|---|---|
| A | 10 |
| B | 1 |
| C | 10 |
| D | 10 |

FIG. 7B

| Node | PRIORITY LEVEL |
|---|---|
| A | 10 |
| B | 10 |
| C | 10 |
| D | 1 |

Node A

| Port ID | MSTID | Cost |
|---|---|---|
| 1 | 1 | 1 |
| 1 | 2 | 1 |
| 2 | 1 | 1 |
| 2 | 2 | 65535 |
| 3 | 1 | 1 |
| 3 | 2 | 1 |

| MSTID | FID |
|---|---|
| 1 | 1 |
| 2 | 2 |

| FID | VLAN ID |
|---|---|
| – | – |

Node B

| Port ID | MSTID | Cost |
|---|---|---|
| 1 | 1 | 1 |
| 1 | 2 | 1 |
| 2 | 1 | 65535 |
| 2 | 2 | 1 |

| MSTID | FID |
|---|---|
| 1 | 1 |
| 2 | 2 |

| FID | VLAN ID |
|---|---|
| – | – |

Node D

| Port ID | MSTID | Cost |
|---|---|---|
| 1 | 1 | 1 |
| 1 | 2 | 1 |
| 2 | 1 | 65535 |
| 2 | 2 | 65535 |

| MSTID | FID |
|---|---|
| 1 | 1 |
| 2 | 2 |

| FID | VLAN ID |
|---|---|
| – | – |

Node C

| Port ID | MSTID | Cost |
|---|---|---|
| 1 | 1 | 1 |
| 1 | 2 | 65535 |
| 2 | 1 | 65535 |
| 2 | 2 | 1 |
| 3 | 1 | 65535 |
| 3 | 2 | 65535 |

| MSTID | FID |
|---|---|
| 1 | 1 |
| 2 | 2 |

| FID | VLAN ID |
|---|---|
| – | – |

FIG. 10

Node A

| Port ID | MSTID | Cost |
|---|---|---|
| 1 | 1 | 1 |
| 1 | 2 | 1 |
| 2 | 1 | 1 |
| 2 | 2 | 65535 |
| 3 | 1 | 1 |
| 3 | 2 | 1 |

| MSTID | FID |
|---|---|
| 1 | 1 |
| 2 | 2 |

| FID | VLAN ID |
|---|---|
| 1 | 1 |

Node B

| Port ID | MSTID | Cost |
|---|---|---|
| 1 | 1 | 1 |
| 1 | 2 | 1 |
| 2 | 1 | 65535 |
| 2 | 2 | 1 |

| MSTID | FID |
|---|---|
| 1 | 1 |
| 2 | 2 |

| FID | VLAN ID |
|---|---|
| 2 | 1 |

Node D

| Port ID | MSTID | Cost |
|---|---|---|
| 1 | 1 | 1 |
| 1 | 2 | 1 |
| 2 | 1 | 65535 |
| 2 | 2 | 65535 |

| MSTID | FID |
|---|---|
| 1 | 1 |
| 2 | 2 |

| FID | VLAN ID |
|---|---|
| 1 | 1 |

Node C

| Port ID | MSTID | Cost |
|---|---|---|
| 1 | 1 | 1 |
| 1 | 2 | 65535 |
| 2 | 1 | 65535 |
| 2 | 2 | 1 |
| 3 | 1 | 65535 |
| 3 | 2 | 65535 |

| MSTID | FID |
|---|---|
| 1 | 1 |
| 2 | 2 |

| FID | VLAN ID |
|---|---|
| 2 | 1 |

| Node | Next | Cost | PARAMETER | PRIORITY LEVEL FLAG |
|---|---|---|---|---|
| A | B | 10 | — | — |
| A | C | 10 | — | — |
| A | D | 10 | — | — |
| B | C | 10 | — | — |
| C | D | 30 | | |

| Node | Next | Cost | PARAMETER | PRIORITY LEVEL FLAG |
|---|---|---|---|---|
| A | B | 10 | 5 | — |
| A | C | 10 | 10 | — |
| A | D | 10 | 1 | — |
| B | C | 10 | 5 | — |
| C | D | 30 | 1 | — |

FIG. 16B

| Node | Next | Cost | PARAMETER | PRIORITY LEVEL FLAG |
|---|---|---|---|---|
| A | B | 10 | 5 | 1 |
| A | C | 10 | 10 | 1 |
| A | D | 10 | 1 | 0 |
| B | C | 10 | 5 | 1 |
| C | D | 30 | 1 | 0 |

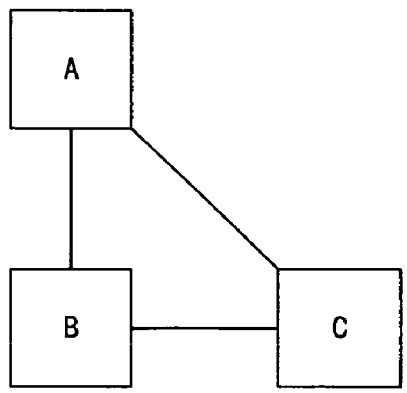
F I G. 1 7 A
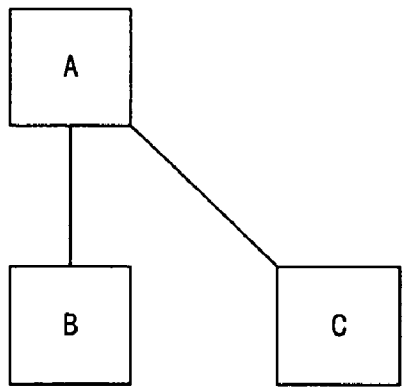
F I G. 1 7 B
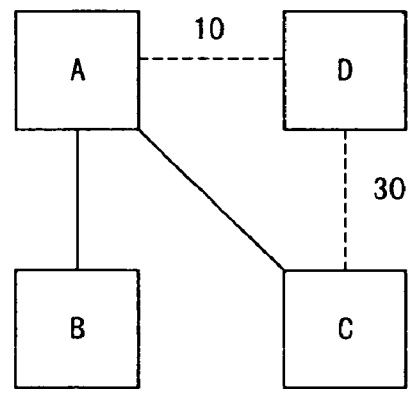
F I G. 1 7 C
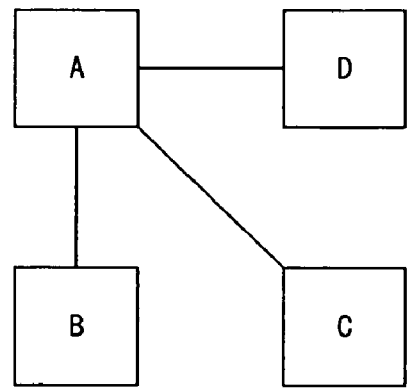
F I G. 1 7 D

TOPOLOGY INFORMATION FOR GROUP A

| Node | Next | Cost |
|---|---|---|
| A | B | 10 |
| A | C | 10 |
| B | C | 10 |

F I G. 1 8 A

SPECIFICATION OF ROOT NODE

| Node | PRIORITY LEVEL |
|---|---|
| A | 1 |
| B | 10 |
| C | 10 |

F I G. 1 8 B

SPANNING TREE WITHIN SET A

| MST ID | Node | Next |
|---|---|---|
| -- | A | B |
| -- | A | C |

F I G. 1 8 C

COMPLETED SPANNING TREE

| MST ID | Node | Next |
|---|---|---|
| 1 | A | B |
| 1 | A | C |
| 1 | A | D |

| Node | Next | Cost | PARAMETER | LINK SELECTION COUNT | PRIORITY LEVEL |
|---|---|---|---|---|---|
| A | B | 10 | 5 | 0 | 1 |
| A | C | 10 | 10 | 0 | 1 |
| A | D | 10 | 1 | 0 | 0 |
| B | C | 10 | 5 | 0 | 1 |
| C | D | 30 | 1 | 0 | 0 |

FIG. 24B

| Node | Next | Cost | PARAMETER | LINK SELECTION COUNT | PRIORITY LEVEL |
|---|---|---|---|---|---|
| A | B | 10 | 5 | 1 | 1 |
| A | C | 10 | 10 | 1 | 1 |
| A | D | 10 | 1 | 1 | 0 |
| B | C | 10 | 5 | 0 | 1 |
| C | D | 30 | 1 | 0 | 0 |

FIG. 24C

| Node | Next | Cost | PARAMETER | LINK SELECTION COUNT | PRIORITY LEVEL |
|---|---|---|---|---|---|
| A | B | 10 | 5 | 1 | 1 |
| A | C | 10 | 10 | 1 | 1 |
| A | D | 10 | 1 | 2 | 0 |
| B | C | 10 | 5 | 1 | 1 |
| C | D | 30 | 1 | 1 | 0 |

| Node | Next | Cost | BANDWIDTH | BANDWIDTH IN USE |
|---|---|---|---|---|
| A | B | 10 | 5 | 0.5 |
| A | C | 10 | 10 | 1.0 |
| A | D | 10 | 1 | 0.8 |
| B | C | 10 | 5 | 2.5 |
| C | D | 30 | 1 | 0.1 |

FIG. 27

| MST ID | Total Hop |
|---|---|
| -- | -- |

FIG. 28A

| MST ID | Total Hop |
|---|---|
| 2 | 2 |
| 3 | 3 |

FIG. 28B

| MST ID | Node | Next |
|---|---|---|
| 1 | A | B |
| 1 | A | D |
| 1 | A | C |
| 2 | A | D |
| 2 | B | C |
| 2 | C | D |
| 3 | A | B |
| 3 | A | C |
| 3 | C | D |

FIG. 29

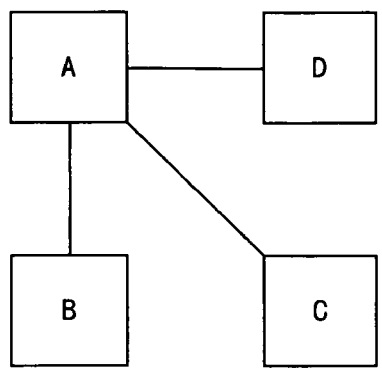
(MST ID=1)
F I G. 3 0 A
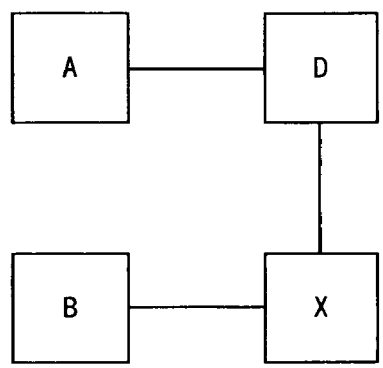
(MST ID=2)
F I G. 3 0 B
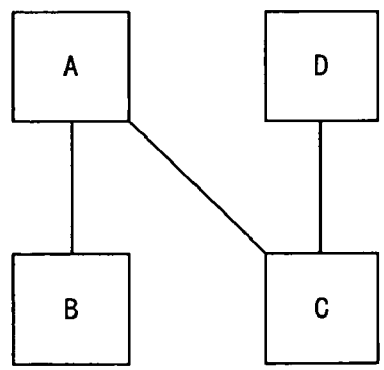
(MST ID=3)
F I G. 3 0 C

| MST ID | BANDWIDTH INCREASE |
|--------|--------------------|
| --     | --                 |

F I G. 3 1 A

| MST ID | BANDWIDTH INCREASE |
|--------|--------------------|
| 2      | 1.0                |
| 3      | 1.5                |

F I G. 3 1 B

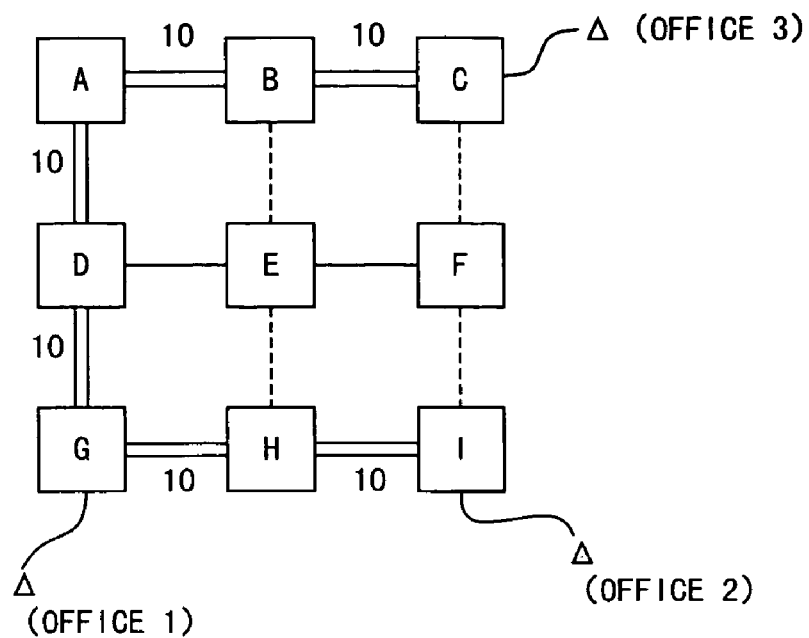
F I G. 3 2 A
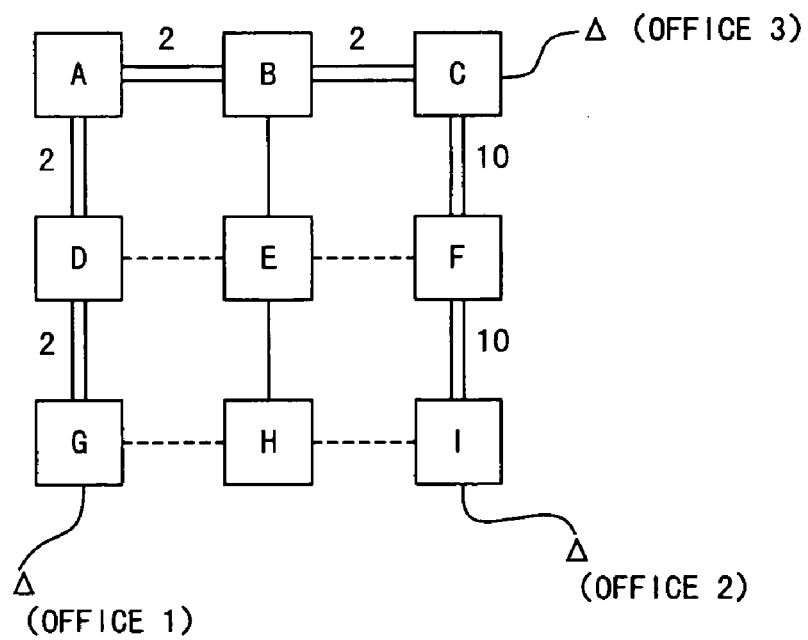
F I G. 3 2 B

| MST ID | VAR |
|--------|-----|
| —      | —   |

F I G. 3 3 A

| MST ID | VAR    |
|--------|--------|
| 2      | 0.0824 |
| 3      | 0.06   |

F I G. 3 3 B

F I G. 3 6 A
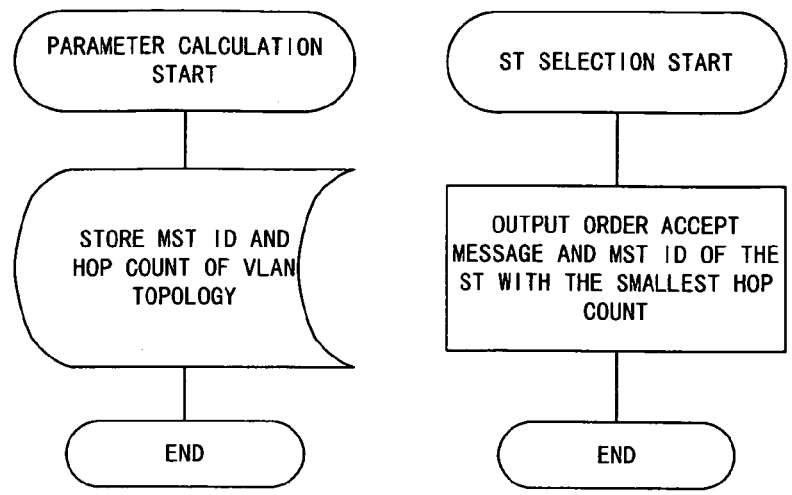
F I G. 3 6 B
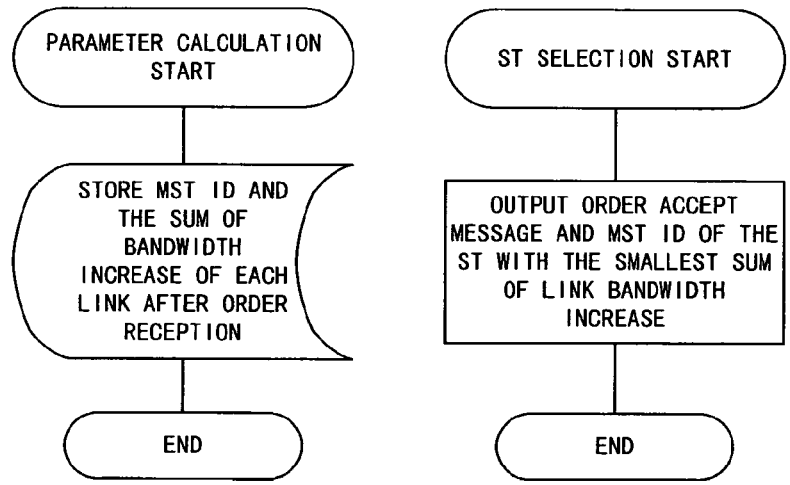
F I G. 3 6 C
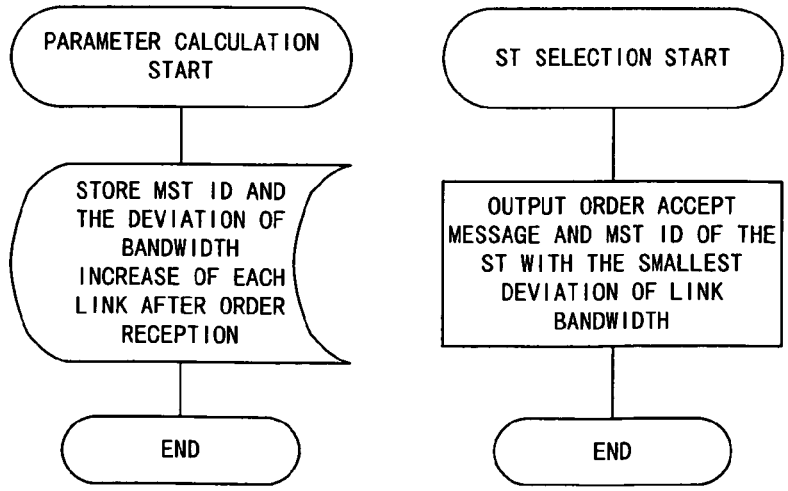

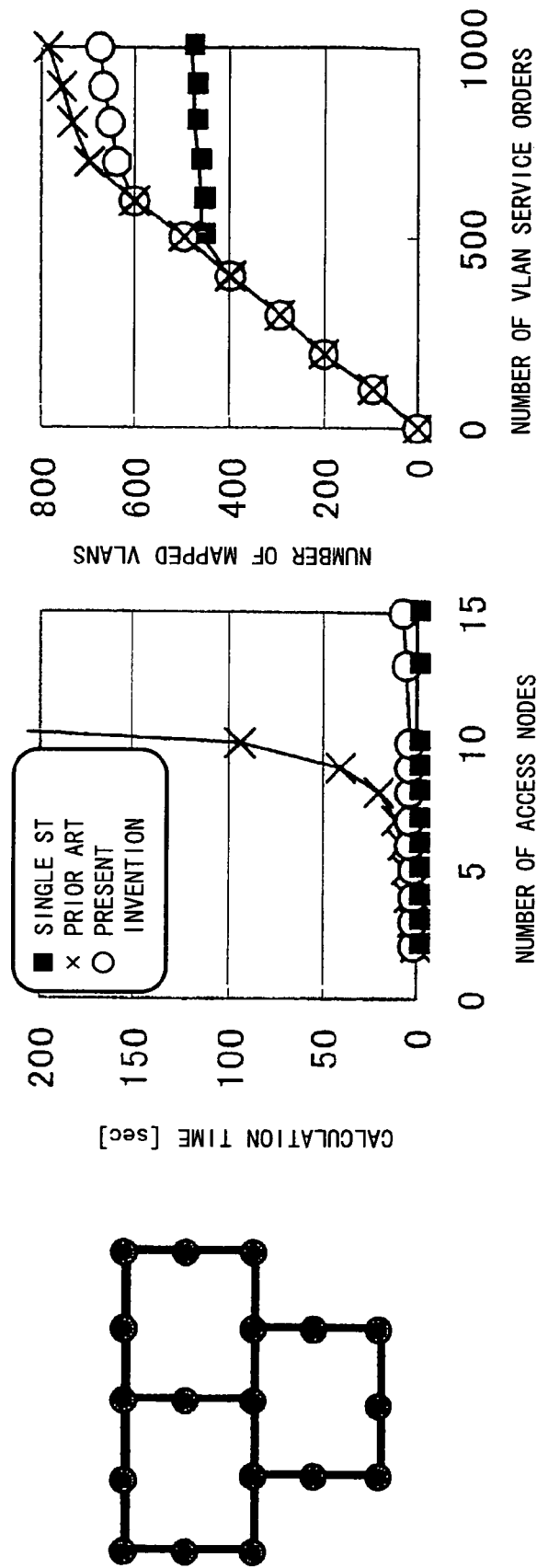
F I G. 38A
F I G. 38B
F I G. 38C

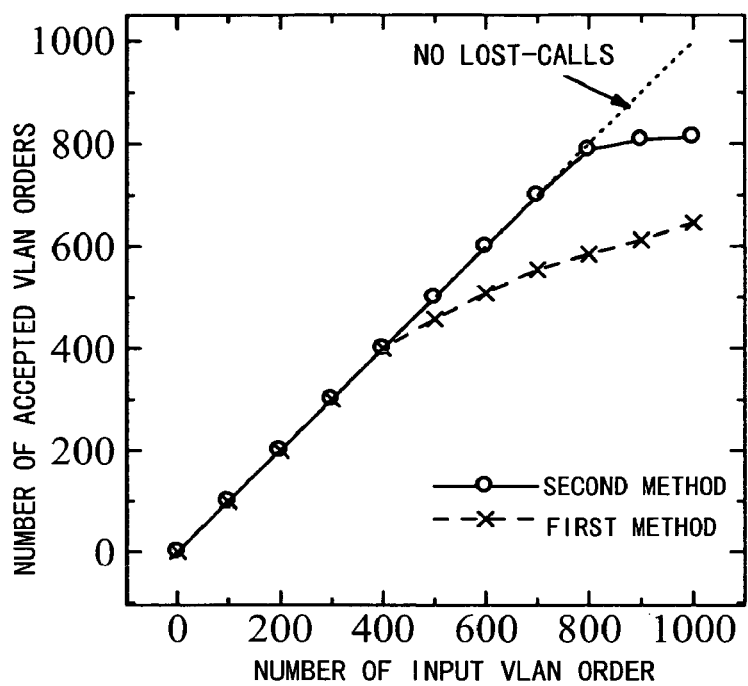
F I G. 39A
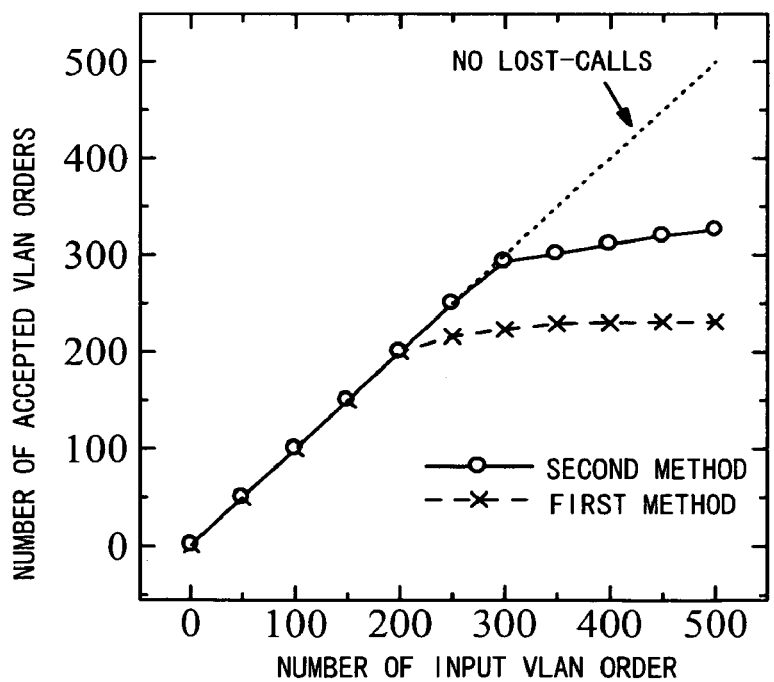
F I G. 39B

VIRTUAL LAN CREATION DEVICE

CROSS REFERENCE TO THE RELATED APPLICATION

This application is a continuation of International Application PCT/JP03/01797, which was filed on Feb. 19, 2003, the contents of which are herein wholly incorporated by reference.

BACKGROUND OF THE INVENTION

1. Field of the Invention

The present invention relates to a device and method for creating a virtual LAN and a network system which provides virtual LAN services. In particular, this present invention relates to a device and method for creating virtual LAN implementing the multiple spanning tree protocol and a network system which provides virtual LAN services implementing the multiple spanning tree protocol.

2. Description of the Related Art

In recent years, due to the implementation of the Gigabit-class Ethernet (registered trademark) technology standardized by the IEEE, virtual LAN (VLAN) services which utilize Ethernet over a comparably wide area and services providing virtual private networks (VPN) are receiving attention. In addition, communication networks for providing these services are established by connecting multiple nodes (bridge node) in a mesh form.

Each node is, for example, a switch and generally comprises a plurality of input/output ports. Therefore, if the paths by with traffic flows are not restricted, traffic circulates a looped path, and a situation wherein the traffic of the entire network increases may occur. In extreme cases, the frame for transmitting traffic is saturated by traffic circulating the looped path, and the communication performance of the network may be lost.

Therefore, in bridged networks of this type, it is necessary to prevent the looped links. IEEE 802.1d-compliant spanning tree protocol (STP) is known as a technology for the prevention thereof.

The spanning tree protocol first determines a root node and defines a spanning tree by selecting links from the root node in a tree form. Each node operates to prohibit the flow of traffic to links other than that included in the defined spanning tree. This operation is realized, for example, by discarding traffic received from a link which is not included in the spanning tree at each node. Procedures such as this prevent the formation of loops.

Furthermore, the spanning tree protocol is extremely effective in operating and managing the network when a node failure occurs, because it has functions which autonomously recreate trees between nodes, and is widely utilized in bridged networks.

When providing virtual LAN services using a bridged network, the traffic of the user receiving the service flows along the tree configured by the spanning tree protocol, between the nodes accommodating the users. However, with the spanning tree protocol, links which are not used at all may exist within the network. This is not beneficial to the operation of the network and is a problematic issue of the spanning tree protocol which should be remedied.

In IEEE 802.1s, multiple spanning tree protocol (MSTP) is standardized as the improved version of the spanning tree protocol. Here, the multiple spanning tree protocol is a protocol which configures a plurality of trees which differ from each other to the assigned network and enables simultaneous operation. It is also considered that efficient use of network resources can be made by implementing this protocol. However, details regarding the configuration methods for implementing multiple spanning tree protocol are beyond the provisions of IEEE, and detailed methods have not yet been determined.

In addition, the paths through which virtual LAN traffic flows (virtual LAN topology) are determined uniquely according to the spanning trees. Therefore, in networks where only one spanning tree is configured, it is not necessary for the network administrator to design a virtual LAN topology. However, in a network operated by multiple spanning tree protocol, a plurality of virtual LAN topologies which differ from each other may exist because a plurality of trees maybe configured. Therefore, the network administrator must determine how to configure the trees to flow virtual LAN traffic, or in other words, how to design the virtual LAN topology.

In order to design a virtual LAN topology so that network resources are effectively used, it is thought that the formation of the spanning trees and the design of the virtual LAN topology should be performed using the following procedures (1) to (4):

(1) Define cost based on the prescribed communication parameter of each link. Here, the cost of the link is a monotonically increasing function which has a positive correlation to the communication parameter.

(2) Form a sub-tree which connects the user accommodating nodes on the assigned virtual LAN with minimum cost as the virtual LAN topology.

(3) Form the spanning tree according to the virtual LAN topology obtained in (2) above.

(4) Accommodate the assigned virtual LAN traffic to the spanning tree obtained in (3) above.

The information used to define the cost in (1) is SET, for example, utilizing a keyboard and the like by the network administrator. However, a configuration wherein a device which collects statistical information regarding network operation is provided on the network, and necessary information is set to each node from this device, can also be considered. This configuration can be actualized by, for example, a certain node collects statistical information and sends setup information to each node.

The procedure (2) above is a Steiner Tree problem which determines the sub-tree to connect some of the nodes within the network, and because no method for solving this in actual time exists, a heuristic search method is implemented.

As a method for finding the sub-tree with the lowest cost, the Rayward-Smith method (hereinafter, RS method) which is widely used as a heuristic solution for Steiner Tree problems is implemented. With the RS method, first, a set including a plurality of single node trees which are made up of nodes (in this case, more than two user accommodated nodes) to be comprised in the sub-tree are prepared. Next, nodes (called relay node) other than those which are comprised in each of the single node trees are selected one by one, and one tree is formed by connecting the single node trees together via the selected relay nodes. The search process is completed when all of the single node trees are comprised in one tree. Here, nodes which have the smallest increase in link cost when being added to the tree is selected as the selected relay nodes. In other words, the node with the smallest value when the sum of the link costs between each user accommodated node and relay node is divided by the number of user accommodated nodes is selected. As a result, the sub-tree with the lowest cost can be found.

After the sub-tree with the lowest cost (virtual LAN topology) which includes user accommodated nodes is obtained using the RS method, the remaining nodes which are not comprised in the virtual LAN topology are added one by one to the virtual LAN topology in order, starting from the node with the smallest increase in cost when being added to the virtual LAN topology. At this time, it is presumed that a closed path has not been formed. This procedure is realized by, for example, the J.B. Kruskal algorithm and R.S. Prime algorithm. This becomes a spanning tree when all nodes have been comprised in the tree.

By mapping the virtual LAN to the spanning tree obtained by the procedures above, effective use of network resources can be made.

In regards to multiple spanning tree protocol, it is stated in detail in the Non-Patent Document 1. However, this protocol is a new technology, and published patent references could not be found at this time. Furthermore, in regards to the RS method, it is stated in Non-patent Document 2.

Non-Patent Document 1

IEEE P802.1s/D15 "Multiple Spanning Trees"

Non-patent Document 2

IEEE JOURNAL ON SELECTED AREAS IN COMMUNICATIONS Vol.6 No.9, December 1988, p.1617-1622, "Routing of Multipoint Communications" (Bernard M. Waxman)

However, when virtual LAN topology is designed using the procedures above, it is known that, in regards to the search for the sub-tree with the lowest cost through RS method, the larger the ratio of the number of nodes in the sub-tree to the total number of nodes in the network, the more its search calculation time increases exponentially. Therefore, if this search process is performed when the request for the creation of a virtual LAN is received from the user, the time required until the virtual LAN service is provided increases enormously, and the network becomes unstable, if there are large numbers of user storage nodes. In addition, because several seconds to several tens of seconds are required until service operation is possible after necessary information has been set in the nodes, if the spanning tree is newly set for each individual virtual LAN, additional waiting period is generated until service provision can commence.

Furthermore, in searches implementing the RS method, although the sub-tree with the lowest cost can be found, it is impossible to find the sub-tree with an arbitrary nth lowest cost. Therefore, in the means for finding spanning trees using the RS method, alternative virtual LAN topologies and/or spanning trees which effectively use communication resources cannot be designed, when the requested virtual LAN service cannot be accommodated due to insufficient available bandwidth in the link on the path.

SUMMARY OF THE INVENTION

An objective of the present invention is to reduce the time required until the provision of virtual LA services commences in a network implementing the multiple spanning tree protocol. Another objective of the present invention is to bring about the effective use of communication resources in a network implementing the multiple spanning tree protocol.

The virtual LAN creation device, according to the present invention, is a device for creating a virtual LAN in a network where a plurality of nodes are connected. The virtual LAN creation device comprises: a topology information storage unit for storing topology information which expresses the topology of the network; a spanning tree creation unit for creating a plurality of spanning trees in reference to the topology information stored in said topology information storage unit; a spanning tree information storage unit for storing spanning tree information which expresses each of the plurality of spanning trees created by said spanning tree creation unit; a spanning tree selection unit for selecting a spanning tree corresponding to a requested virtual LAN, out of the plurality of spanning trees which are expressed by the spanning tree information stored in said spanning tree information storage unit; and a node setup unit for setting spanning tree information stored in said spanning tree information storage unit, and mapping information which expresses the correspondence between the spanning tree selected by said spanning tree selection unit and the requested virtual LAN, in the plurality of nodes.

In the present invention, a plurality of spanning trees are provided before hand. When a virtual LAN order is received, one spanning tree is selected out of the plural spanning trees, and the virtual LAN is mapped to this selected tree. Therefore, it is not necessary to create a new spanning tree every time a virtual LAN order is received, and the time required to design the virtual LAN and the time it takes until virtual LAN service can actually be provided are reduced.

The virtual LAN creation device further comprises a link priority setting unit for adding link priority level information, which expresses the priority level of each of the links between the plurality of nodes, to the topology information stored in said topology information storage unit, and wherein said spanning tree creation unit creates a plurality of spanning trees in reference to link priority information. According to this invention, virtual LAN corresponding to the priority level of each link can be provided because spanning trees adhering to the priority level of each link are being used.

The link priority setting unit may add the link priority information for each link based on the instructions from the network administrator. In this case, virtual LAN traffic can be assigned preferentially to the link specified by the network administrator.

The link priority setting unit may add the link priority information for each link based on the bandwidth of each link. In this case, if links with a larger bandwidth are prioritized, spanning trees are created preferentially using links with large bandwidths. Therefore, virtual LAN traffic is assigned preferentially to links with large bandwidth and the shortage of bandwidth in certain links can be prevented.

If links with small transmission delay time are prioritized, a virtual LAN wherein the end-to-end transmission delay time is kept low can be provided. Furthermore, if links with low usage costs are prioritized, the network administrator can provide virtual LAN services for a moderate resource usage cost.

The spanning tree creation unit may create a plurality of spanning trees to comprise each link at least once in any of the spanning trees. In this case, waste of communication resources is reduced because there are no links which have no possibility of being used at all.

The spanning tree selection unit may select a spanning tree with the lowest total hop count when a requested virtual LAN is mapped. In this case, the amount of traffic within the entire network can be reduced because the number of links forwarding the virtual LAN traffic is reduced, and more virtual LAN can be mapped in a limited communication resource. Furthermore, the amount of memory required for the system used by the virtual LAN services provider can be reduced because the information (number of links) managed for each link is reduced, and the system can be built at a low cost.

In addition, the spanning tree selection unit may select a spanning tree with the lowest sum of bandwidth which should be newly assigned to each link when a requested virtual LAN is mapped. In this case as well, the amount of traffic within the entire network can be reduced. Although various types such as full-mesh connection and star connection can be anticipated as bandwidth services for virtual LAN, according to this invention, virtual LAN which is ideal for the user's requests can be provided as well because spanning trees can be selected taking into consideration the contents of the bandwidth service.

Furthermore, the spanning tree selection unit may select a spanning tree with the smallest variation in the link usage rate within the entire network when the requested virtual LAN is mapped. In this case, situations where virtual LAN, which interconnects certain nodes, cannot be mapped due to insufficient local bandwidth are prevented because the amount of traffic flowing through the network is equalized. In other words, more virtual LANs can be mapped in a limited communication resource.

The link usage rate can be calculated based on the sum of the bandwidth requested by the virtual LAN to be mapped and the bandwidth already assigned to each link. In this case, periodic collection of link information becomes unnecessary because link usage rates can be found by the cumulative values of the requested bandwidth of each virtual LAN service, and operation becomes simpler. Alternatively, the link usage rate can be calculated based on the sum of the bandwidth requested by the virtual LAN to be mapped and the bandwidth actually being used in each link. In this case, non-guaranteed bandwidth traffic (best-effort service traffic) can be assigned efficiently because bandwidths which are not actually being used can be assigned to other virtual LANs.

In addition, the spanning tree selection unit may select a spanning tree with the smallest sum of transmission delay time of the path the traffic is flowing through when the requested virtual LAN is mapped. In this case, the spanning tree to which each virtual LAN can be mapped with the smallest transmission delay time is selected out of the selectable spanning trees. In other words, it can accommodate users using applications which are uncompromising towards delays in audios, video images, and the like.

Furthermore, the spanning tree selection unit may select the spanning tree with the smallest sum of usage costs for the paths through which the virtual LAN traffic flows when the requested virtual LAN is mapped. In this case, it is economically beneficial, for example, to businesses which borrow lines from another company to provide services because operation costs can be kept low.

BRIEF DESCRIPTION OF THE DRAWINGS

FIG. 1 is a block diagram of a network in an embodiment according to the present invention;

Figure 3:
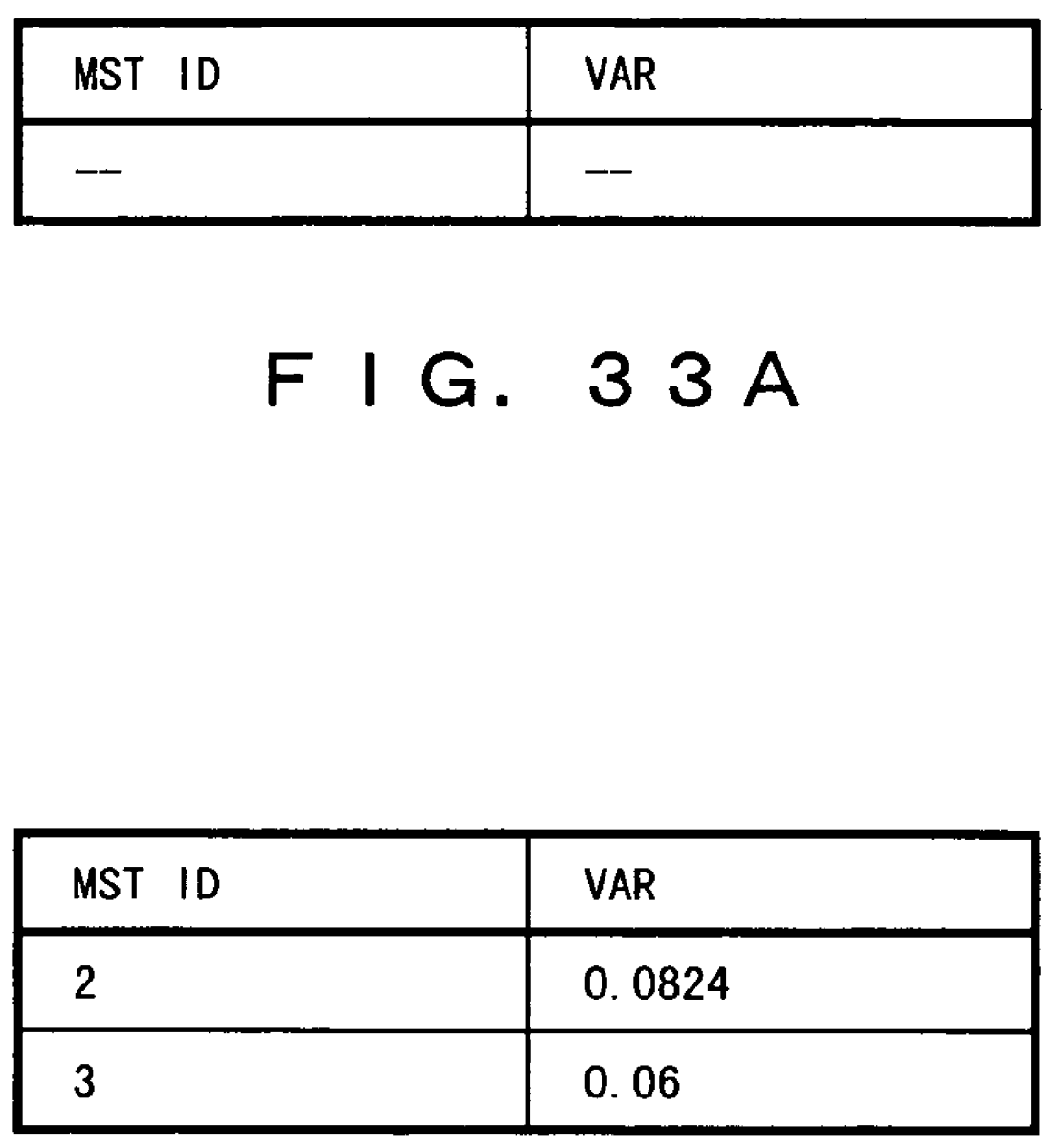

FIG. 3 is an example of a topology information storage table;

FIG. 4 is a diagram showing the configurations of a spanning tree information storage table;

FIG. 5 is an example (1) of an updated spanning tree information storage table;

FIG. 6 is an example of a created spanning tree;

FIG. 7 is an example (2) of an updated spanning tree information storage table;

FIG. 8 is an example (3) of an updated spanning tree information storage table;

FIG. 9 is an example of the information set in each node (spanning tree setting);

FIG. 10 is an example of the information set in each node (including virtual LAN setting);

FIG. 15 is a diagram showing the configurations of a topology information storage table according to a first embodiment;

FIG. 16 is a diagram explaining the process wherein the priority level of each link is determined;

FIG. 17 is a diagram explaining the procedures for creating a spanning tree using links with high priority;

FIG. 18 is an example of the table used when creating a spanning tree using links with high priority;

FIG. 24 is a diagram explaining the procedures for creating a plurality of spanning trees in reference to the number of times link selection is made;

FIG. 27 is an example of the topology information storage table according to a third embodiment;

FIG. 28 is an example of a hop count management table;

FIG. 29 is an example of a spanning tree information storage table;

FIG. 30 is an example of a spanning tree created beforehand;

FIG. 31 is an example of a bandwidth increase management table;

FIG. 32 is a diagram explaining the operations for selecting spanning trees according to a fourth embodiment;

FIG. 33 is an example of a variation management tables;

FIG. 36 and FIG. 37 are diagrams explaining the main points in the flowchart shown in FIG. 35;

FIG. 38 and FIG. 39 are diagrams explaining simulation results; and

DESCRIPTION OF THE PREFERRED EMBODIMENTS

Hereinafter described are embodiments according to the present invention.

FIG. 1 is a block diagram of a network in the embodiments according to the present invention. A plurality of bridge nodes (node A, node B, node C, and node D), links connecting these nodes, and a network administration system 1 are herein illustrated. Although a network which has four nodes is illustrated in FIG. 4 to simplify the explanations, the number of nodes is not particularly limited.

Each node is, for example, a switch and supports the Multiple Spanning Tree Protocol (MSTP). Each node comprises a plurality of input/output ports. Furthermore, each node comprises a function for controlling the opening and closing of input/output ports in compliance with instructions from the network administration system 1.

Nodes are interconnected by communication lines (links). In FIG. 1, a link which connects port 1 of node A and port 1 of node B, a link which connects port 2 of node A and port 1 of node C, a link which connects port 3 of node A and port 1 of node D, a link which connects port 2 of node B and port 2 of node C, and a link which connects port 3 of node C and port 2 of node D are provided. The bridged network comprises these nodes and links.

The network administration system 1 is actualized by one or a plurality of computers and comprises a function for creating a virtual LAN on the bridged network. In other words, the network administration system 1 operates as a virtual LAN creation device. In addition, the network administration system 1 comprises a function for transmitting information to control each node, utilizing Data Communication Network (DCN) which is a publicly-known technology. In other words, the network administration system 1 can send a command to collect statistical information and various control commands to each node via DCN by Telnet. Although the network administration system 1 is connected only to node A in FIG. 1, it can be connected to node A to node D, respectively. Furthermore, the communication method between the network administration system 1 and each node is not particularly limited.

Figure 2:
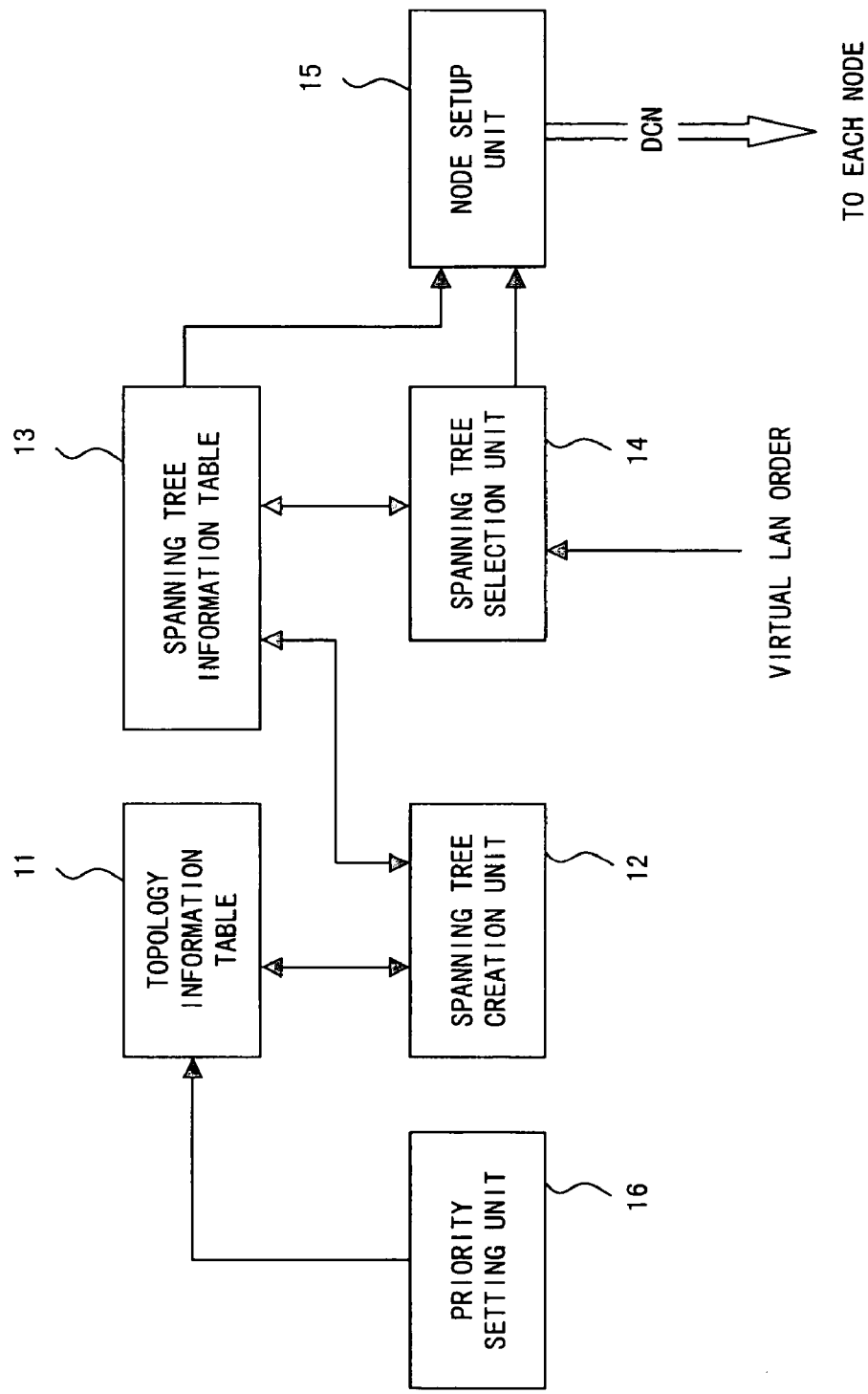
FIG. 2 is a block diagram of the network administration system.

FIG. 2 is a block diagram of the network administration system 1. Only functional blocks which operate as the virtual LAN creation device is illustrated in FIG. 2.

Topology information table 11 stores topology information which expresses the topology of the network shown in FIG. 1. Here, the topology information is, for example, input by the network administrator. Alternatively, the network administration system 1 can send a message to each node to investigate the network topology, and topology information can be collected based on the responses to the message from each node.

Spanning tree creation unit 12 creates a plurality of spanning trees in reference to the topology information stored in the topology information table 11. Spanning tree information table 13 stores spanning tree information which expresses each of the plural spanning trees created by the spanning tree creation unit 12. In other words, a plurality of spanning trees is registered to the spanning tree information table 13.

Spanning tree selection unit 14 selects a spanning tree corresponding to a virtual LAN order from the user, out of the plurality of spanning trees expressed by the spanning tree information stored in the spanning tree information table 13. Here, the virtual LAN order is information which expresses a virtual LAN requested by the user, and includes information such as that for identifying a node which accommodates user and that which expresses bandwidth (or traffic volume).

Node setup unit 15 sets the spanning tree information stored in the spanning tree information table 13 and mapping information, which indicate the correspondence between the spanning trees selected by the spanning tree selection unit 14 and the virtual LAN requested by the virtual LAN order, to nodes A through D.

Priority setting unit 16 attaches link priority level information, which expresses the priority level of each link between the nodes, to the topology information stored in the topology information table 11. Here, the link priority level information is, for example, input by the network administrator. Alternatively, link priority level information can be generated based on the bandwidth of each link, the transmission delay time of each link, and the usage cost of each link.

Figure 3:
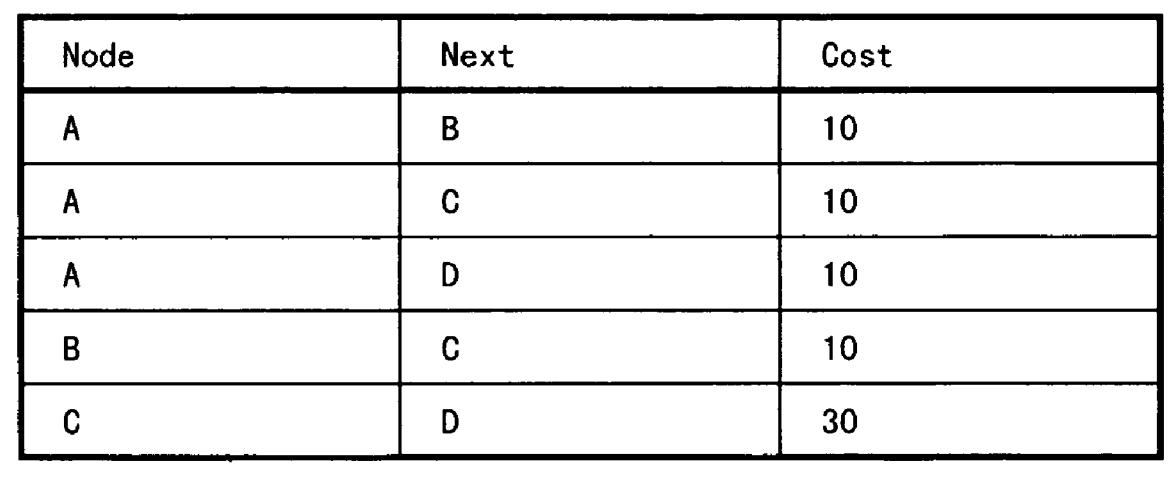

FIG. 3 is an example of the topology information table 11. Topology information which expresses the topology of the bridged network shown in FIG. 1 is herein stored. For example, the contents of the first line shows node A is connected to node B, and the link cost between these two nodes is "10". "Cost" is a parameter indicating the weight of the link and is, for example, determined by the communication bandwidths of each link. In this case, the larger the bandwidth is, the smaller the cost.

FIG. 4 is a diagram showing a spanning tree information table 13. The spanning tree information table 13 comprises a spanning tree table shown in FIG. 4A and a root node management table shown in FIG. 4B.

A spanning tree identifier (MSTID), which identifies each spanning tree, and information expressing connection relations attributed to each spanning tree are registered to the spanning tree table. Meanwhile, the root node management table is used to manage the root node of the spanning tree which should be created, while sequentially creating a plurality of spanning trees.

Next is an explanation of the procedures for creating a spanning tree. Here, the plurality of spanning trees are created on the bridged network shown in FIG. 1.

The spanning tree creation unit 12 determines a root node in reference to the topology information table 11. The method for determining the root node out of a plurality of nodes is not particularly limited and is, for example, selected randomly. Here, it is assumed that node A is selected as a root node. In this case, the root node management table is updated as shown in FIG. 5B. "Priority level=1" indicates that corresponding node is selected as the root node, and nodes other than the root node are given "priority level=10".

Next, the spanning tree creation unit 12 creates one spanning tree with node A as the root node in reference to the topology information table 11 shown in FIG. 3 and a root node management table shown in FIG. 5B. Here, the creation of the spanning tree is actualized, for example, by the method (dijkstra algorithm) stated in IEEE 802.1D, which is a publicly-known technology. As a result, a spanning tree shown in FIG. 6A is created. In other words, a spanning tree wherein the status of the link between nodes B and C and the link between nodes C and D are Disable (disabled) is created. Then, the information shown in FIG. 5A is registered to the spanning tree table. This information indicates that the spanning tree identified by "MSTID=1" comprises the link between nodes A and B, the link between nodes A and D, and the link between nodes A and C.

It is preferable that corresponding traffic does not flow through a link which is in a Disable state. However, realistically, frames may be forwarded from a node on the upstream of a link which is not included in the spanning tree (hereinafter, Disable link) via this Disable link. In this case, the node on the downstream of the Disable link discards the frame, and the formation of a loop is prevented. In this way, the Disable link becomes a "link which is not efficiently used" even when some sort of traffic is forwarded because this traffic is not forwarded further. However, if the GVRP protocol which is prescribed in IEEE 802.1Q is implemented, the transmission of traffic through links not comprised in the spanning tree can be stopped.

Subsequently, the spanning tree creation unit 12 selects a new root node. Here, node B is selected as the root node, and the root node management table is updated to the state shown in FIG. 7B. In this case, the spanning tree creation unit 12 creates one new spanning tree which corresponds to this root node. As a result, the spanning tree shown in FIG. 6B is created. In other words, a spanning tree wherein the status of the link between nodes A and C and the link between node C and D is Disable (disabled) is created. Then, the information shown in FIG. 7A is registered to the spanning tree table. This information indicates that the spanning tree identified by "MSTID=2" comprises the link between nodes A and B, the link between nodes B and C, and the link between nodes A and D.

Figure 8:
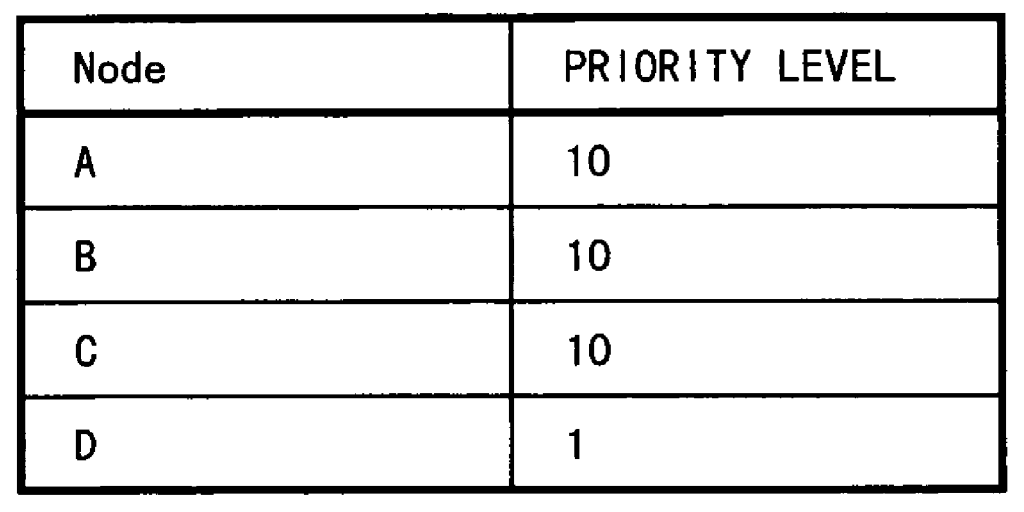

Furthermore, the spanning tree creation unit 12 selects the next root node. Here, node D is selected as the root node, and the root node management table is updated to the state shown in FIG. 8. The spanning tree creation unit 12 creates one new spanning tree which corresponds to this root node. However, if the spanning tree is created under the conditions above, the spanning tree shown in FIG. 6A will be obtained as a result. Therefore, in this case, this newly created spanning tree is not registered to the spanning tree table.

Whether or not the newly created spanning tree and the previously created spanning tree match can be determined by comparing the links comprised in each spanning tree or by comparing the links in a Disable state with each other.

In addition, although random selection of the root node is given as a method for obtaining a spanning tree with a different configuration, other methods exist, such as increasing the cost of a link which is to be comprised in the spanning tree by a fixed amount (for example, 1) every time a new spanning tree is created.

Subsequent spanning trees are created one by one in this same way. Then, the spanning tree creation unit 12 stops processing when a predetermined number of spanning trees have been created or when the spanning tree table is not updated even when the process for creating the spanning tree is repeated a predetermined number of times (for example, 50 times).

In this way, the spanning tree creation unit 12 creates a plurality of spanning trees and stores the spanning tree information expressing these spanning trees in the spanning tree information table 13. Accordingly, a plurality of spanning trees which differ from each other are registered to the spanning tree information table 13.

When a plurality of spanning trees are created as described above, the node setup unit 15 sets the information which expresses the plural spanning trees in nodes A through D. Specifically, the node setup unit 15 sets the cost of each input/output port. In this case, for example, "1" is set as the cost of the ports of the nodes which connect to a link comprised in the spanning tree and "65535" is set as the cost of the ports of the nodes which connect to other links for each spanning tree. In addition, the node setup unit 15 sets the mapping information of the forwarding identifier (FID) which is stored in the forwarding data base of each node (Forwarding DB) and the spanning tree identifier (MSTID) In regards to the mapping of FID and MSTID, it is stated in IEEE 802.1s.

FIG. 9 is an example of the information set in each of the nodes A to D. Expressed herein is a state wherein corresponding information is set based on the spanning tree table shown in FIG. 7A. In other words, information expressing the spanning tree shown in FIG. 6A and the spanning tree shown in FIG. 6B are set in each node.

For example, the link between port 1 of node A and port 1 of node B is used in the spanning tree shown in FIG. 6A. Therefore, in FIG. 9, port 1 of node A has "cost=1" when used as the spanning tree 1. By the same token, port 1 of node B has also "cost=1" when used as the spanning tree 1.

On the other hand, the link between port 2 of node B and port 2 of node C is not used in the spanning tree shown in FIG. 6A. Therefore, in FIG. 9, port 2 of node B has "cost=65535" when used as the spanning tree 1. By the same token, port 2 of node C has also "cost=65535" when used as the spanning tree 1.

Furthermore, the correspondence between the forwarding identifier (FID) and the spanning tree identifier (MSTID) is registered in each node. Here, the fact that "FID=1" and "MSTID=1" correspond, and "FID=2" and "MSTID=2" correspond is registered.

After the configurations above are completed, the network administration system 1 awaits the input of a virtual LAN order. Here, the virtual LAN order comprises, for example, information which specifies the a node in which a user who is attempting to receive virtual LAN services is accommodated and information declaring the bandwidth the user wishes to use between each node. When the virtual LAN order is input to the network administration system 1, the spanning tree selection unit 14 selects one spanning tree for mapping the virtual LAN requested by the virtual LAN order, out of the plurality of spanning trees registered in the spanning tree information table 13. Although the methods for selecting the spanning tree are explained in detail hereinafter, they are not particularly limited herein, and the spanning tree is selected, for example, randomly.

Here, node B and node C are specified as the user accommodated nodes by the virtual LAN order. In addition, the spanning tree identified by "MSTID=2" (in other words, the spanning tree shown in FIG. 6B) is selected as the spanning tree to which the virtual LAN is mapped by the spanning tree selection unit 14. In this case, the node setup unit 15 sets the information for mapping the virtual LAN using the selected spanning tree to corresponding nodes. Specifically, the mapping of the virtual LAN identifier VLAN ID, and the spanning tree identifier MSTID is performed in node B and node C, in reference to the table corresponding to the forwarding identifier FID, and the spanning tree identifier MSTID. In this example, since a spanning tree identified by "MSTID=2" is selected, "FID=2" is detected as the forwarding identifier corresponding to the spanning tree identifier "MSTID=2". Then, the virtual LAN requested by the virtual LAN order is assigned in regards to the detected forwarding identifier FID. In FIG. 10, the virtual LAN requested by the virtual LAN order is indicated by "VLANID=1". Therefore, the virtual LAN requested by the virtual LAN order (VLANID=1) is mapped to the spanning tree identified by "MSTID=2" via the forwarding identifier (FID=2) in node B and node C.

After the configuration above is completed, the traffic of this user (namely, traffic of the virtual LAN identified by "VLANID=1") is forwarded only through the spanning tree identified by "MSTID=2". With the multiple spanning tree protocol, virtual LAN traffic may be sent through Disable links not comprised in the spanning tree, and there is a risk of a congestion occurring at the transmitting terminal of the link. However, it is possible for each node to stop the transmission of traffic to Disable links by existing protocols such as GVRP.

Nodes B and C which have been configured as stated above operate, for example, as is described below. However, although it is slightly lacking in accuracy in order to simplify the explanation, it is presumed here that the use of ports set to "Cost=1" is permitted and the use of ports set to "Cost=65535" are prohibited. In addition, it is also presumed that data transmission to links connected to ports set to "Cost=655535" (in other words, Disable links) can be stopped.

Nodes B and C refer to the virtual LAN identifier attached to the frame, when a virtual LAN data frame is received through an access link. It is presumed that, at this time, "VLANID=1" is attached as the virtual LAN identifier of this frame. In this case, nodes B and C obtain the forwarding identifier (FID=2) corresponding to this virtual LAN identifier, and also obtains the spanning tree identifier (MSTID=2) corresponding to this forwarding identifier. Here, if a spanning tree identified by "MSTID=2" is used, for example, the use of ports 1 and 3 are prohibited and only part 2 can be used in node C. Therefore, node C can transmit the virtual LAN data frame to node B via port 2, but cannot transmit this frame to nodes A and D via ports 1 and 3. In other words, the virtual LAN data frame is permitted to be transmitted only through the spanning tree shown in FIG. 6B.

Furthermore, it is presumed that node C has received the virtual LAN data frame identified by "VLANID=1" via port 1. In this case, node C acknowledges that the use of port 1 is prohibited, as in the case above. Then, node C discards the received frame. In this way, each node discards the frame if the virtual LAN data frame is received through a link which is not comprised in the corresponding spanning tree.

Through these operations, the formation of a looped path on the bridged network can be prevented.

Figure 11:
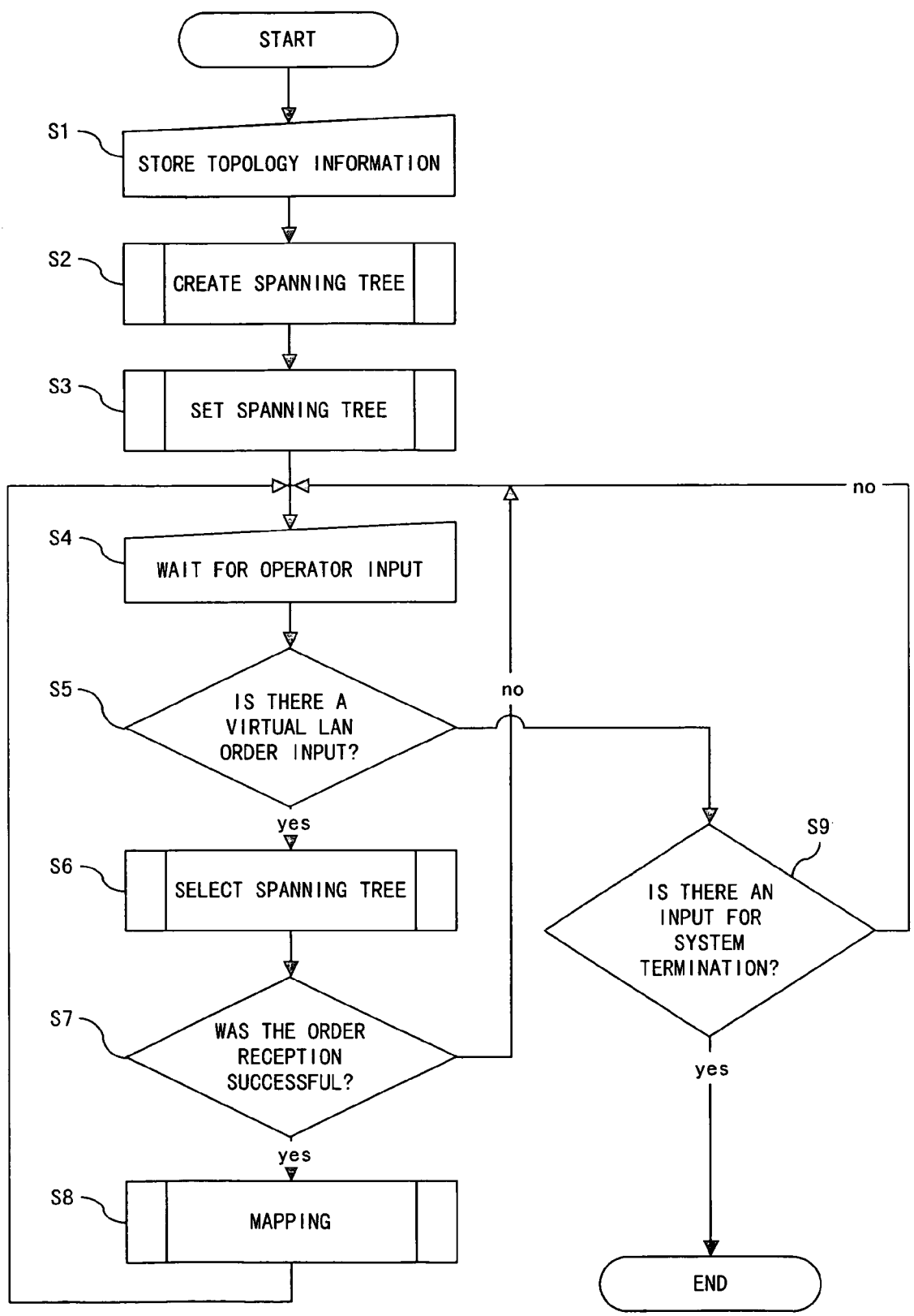
FIG. 11 is a flowchart showing an overview of the procedures of the virtual LAN creation method according to the present invention.

FIG. 11 is a flowchart showing an overview of the procedures of the virtual LAN creation method in an embodiment according to the present invention.

In step S1, topology information which expresses the topology of the bridged network is stored in topology information table 11. Topology information is, for example, provided by the network administrator.

In step S2, a plurality of spanning trees are created by the spanning tree creation part 12. The spanning tree information which expresses these spanning trees is stored in the spanning tree information table 13. In other words, a plurality of spanning trees are registered to the spanning tree information table 13.

In step S3, the plurality of spanning trees registered in the spanning tree information table 13 are set in node A to node D by the node setup unit 15.

In step S4 and S5, the network administration system 1 awaits the input of a virtual LAN order. When the virtual LAN order is input, one spanning tree out of the plurality of spanning trees registered to the spanning tree information table 13 is selected in step S6. In step S7, whether or not the requested virtual LAN can be mapped to the spanning tree selected in step S6 is checked. These processes are performed by the spanning tree selection unit 14.

If the virtual LAN can be mapped to the selected spanning tree, the mapping information which expresses the correspondence between the spanning tree and the virtual LAN is set in the corresponding nodes in step S8. On the other hand, if the virtual LAN cannot be mapped to the selected spanning tree, the process is returned to step S4 after informing the user thereof. The network administration system 1 stands by in a mode awaiting a virtual LAN order until an instruction to stop operation is input (step S9).

In this way, in the virtual LAN creation method according to the present invention, a plurality of spanning trees are created and registered beforehand. Then, when a virtual LAN order is input, one spanning tree out of the registered plurality of spanning trees is selected and used. Therefore, the time required from the input of the virtual LAN order to the start of service provision is short.

Figure 12:
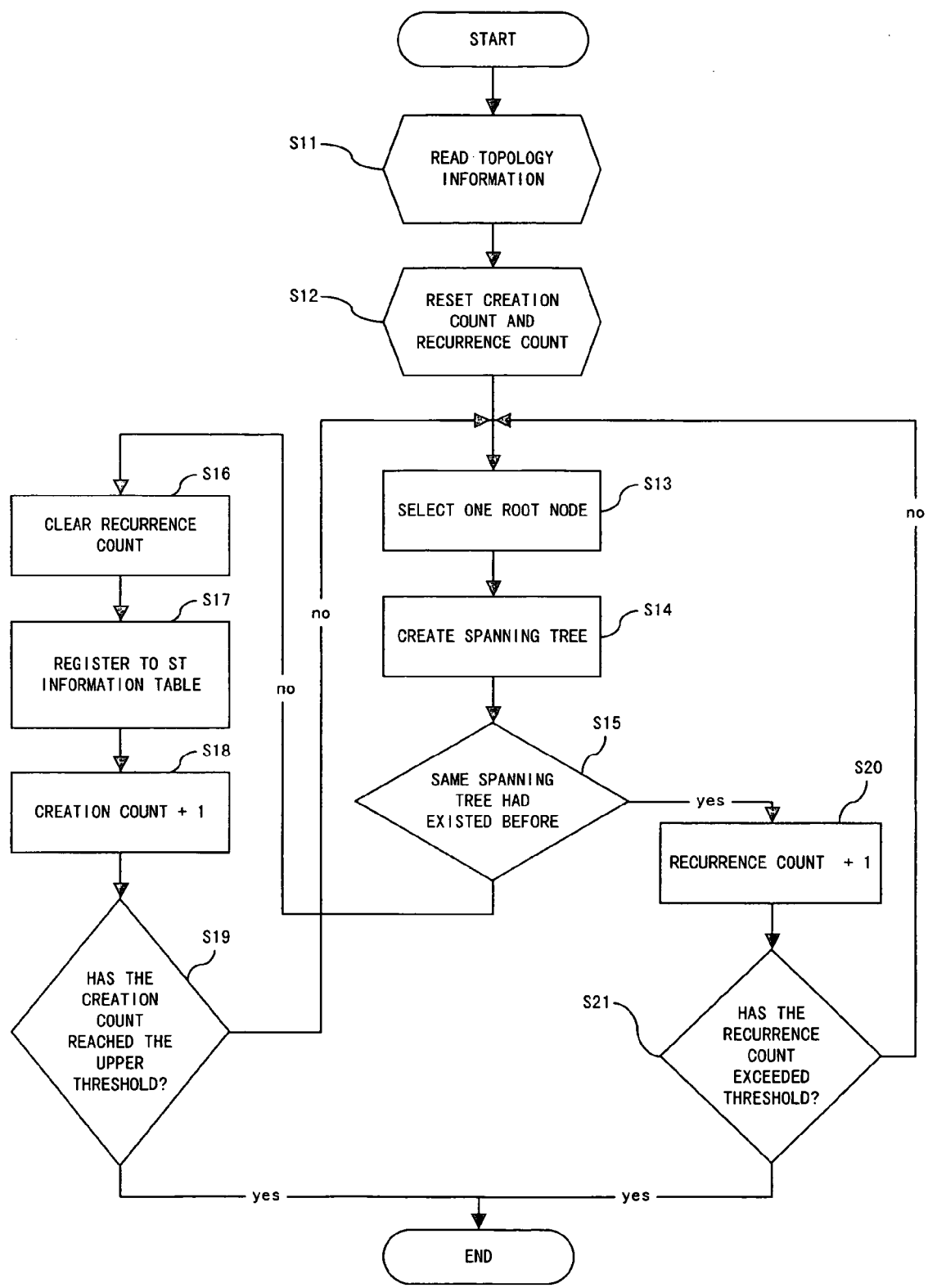
FIG. 12 is a flowchart showing the basic operations of the spanning tree creation unit.

FIG. 12 is a flowchart showing the basic operations of the spanning tree creation unit 12. This flowchart shows the process in step S2 shown in FIG. 11 in detail.

Instep S11, topology information is obtained from the topology information table 11. In step S12, "creation count" and "recurrence count", which are variables used when creating a plurality of spanning trees, are reset. "Creation count" indicates the number of spanning trees, which differ from each other, created by performing the process in step S2. In addition, "recurrence count" indicates the number of times a spanning tree which is the same as that created previously is repeatedly created.

In step S13, a root node is selected. The method for selecting the root node is not particularly limited. For example, the node with the smallest node ID can be selected every time, all nodes can be selected in order, or the node can be selected randomly. In step S14, one spanning tree which corresponds to the root node selected in step S13 is created. The method for creating the spanning tree can be actualized, for example, by using publicly-known technology.

In step S15, whether or not the newly created spanning tree is the same as any of the previously created spanning trees is checked. Then, if the newly created spanning tree differs from any of the spanning trees created previously, the "recurrence count" is cleared in step S16. The newly created spanning tree is registered to the spanning tree information table 13 in step S17. Furthermore, the "creation count" is incremented in step S18.

In step S19, whether or not the "creation count" has reached the target figure is checked. The process is completed if the "creation count" has reached the target figure, and if it has not, the network administration system 1 returns to step S13 and creates the next spanning tree.

If the newly created spanning tree is the same as any of the spanning trees created previously, the "recurrence count" is incremented in step S20. Then, in step S21, whether or not this "recurrence count" has exceeded the predetermined threshold is checked. The process is completed if the "recurrence count" has exceeded the threshold, and if it has not, the network administration system 1 returns to step S13 and creates the next spanning tree.

In this way, the spanning tree creation unit 12 creates predetermined number of spanning trees that differ from each other. However, even if the predetermined number of different spanning trees cannot be created, the process is completed if the same spanning tree is created repeatedly. The plurality of spanning trees which differ from each other created in this way are registered to the spanning tree information table 13.

Figure 13:
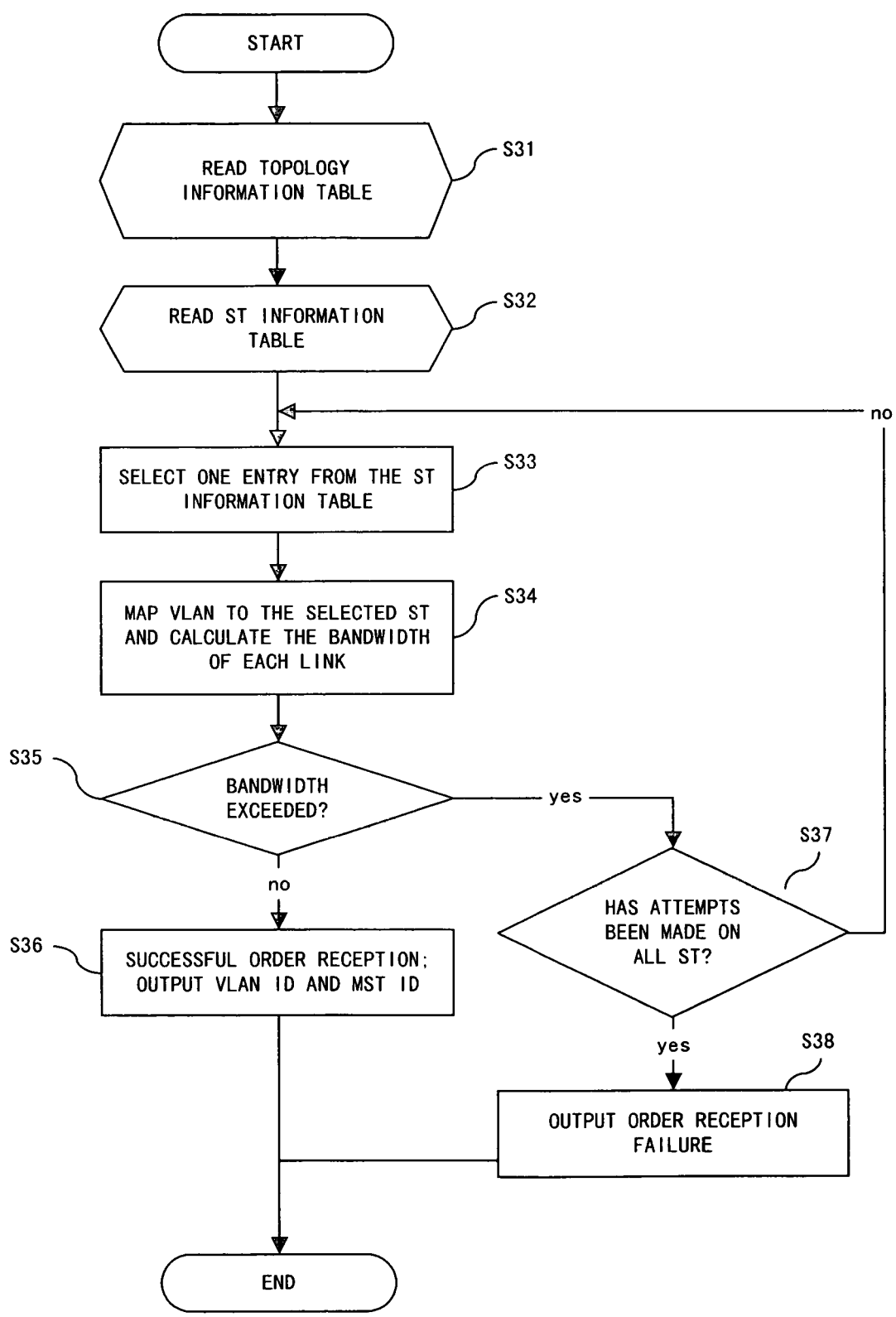
FIG. 13 is a flowchart showing the basic operations if the spanning tree selection unit.

FIG. 13 is a flowchart showing the basic operations of the spanning tree selection unit 14. This flowchart shows the processes in step S6 and S7 shown in FIG. 11 in detail.

In step S31, topology information is obtained from the topology information table 11. In step S32, spanning tree information is obtained from the spanning tree information table 13.

In step S33, one spanning tree is selected out of the plurality of spanning trees registered in the spanning tree information table 13. Here, the method for selecting the spanning tree is not particularly limited. For example, the spanning tree can be selected in the order it was entered into the spanning tree information table 13, or it can be selected randomly.

In step S34 and S35, each link in the selected spanning tree is checked to determine whether or not the virtual LAN requested by the user can be mapped therein. Specifically, for example, whether or not the sum of the bandwidth to be used, which is assigned to each virtual LAN, exceeds the bandwidth of each link is investigated. For example, under the premise that the bandwidth of a certain link is 100M and 90M of this bandwidth is already assigned to other virtual LANs, in this case, a virtual LAN newly requested by the user cannot be mapped if the bandwidth being used by the new virtual LAN exceeds 10M.

If the newly requested virtual LAN can be mapped, the virtual LAN identifier (VLANID) for identifying this new virtual LAN and the spanning tree identifier (MSTID) for identifying the spanning tree selected in step S33 are output in step S36 to provide services in correspondence to the new virtual LAN order.

On the other hand, if the newly requested virtual LAN cannot be mapped, the network administration system 1 returns to step S33 via step S37 and selects the next spanning tree. However, if the virtual LAN cannot be mapped to any of the spanning trees which are registered in the spanning tree information table 13, a message stating that the newly requested virtual LAN services cannot be provided is output in step S38.

In this way, the spanning tree selection unit 14 selects a spanning tree to which the requested virtual LAN can be mapped out of the plurality of spanning trees provided beforehand.

Figure 14:
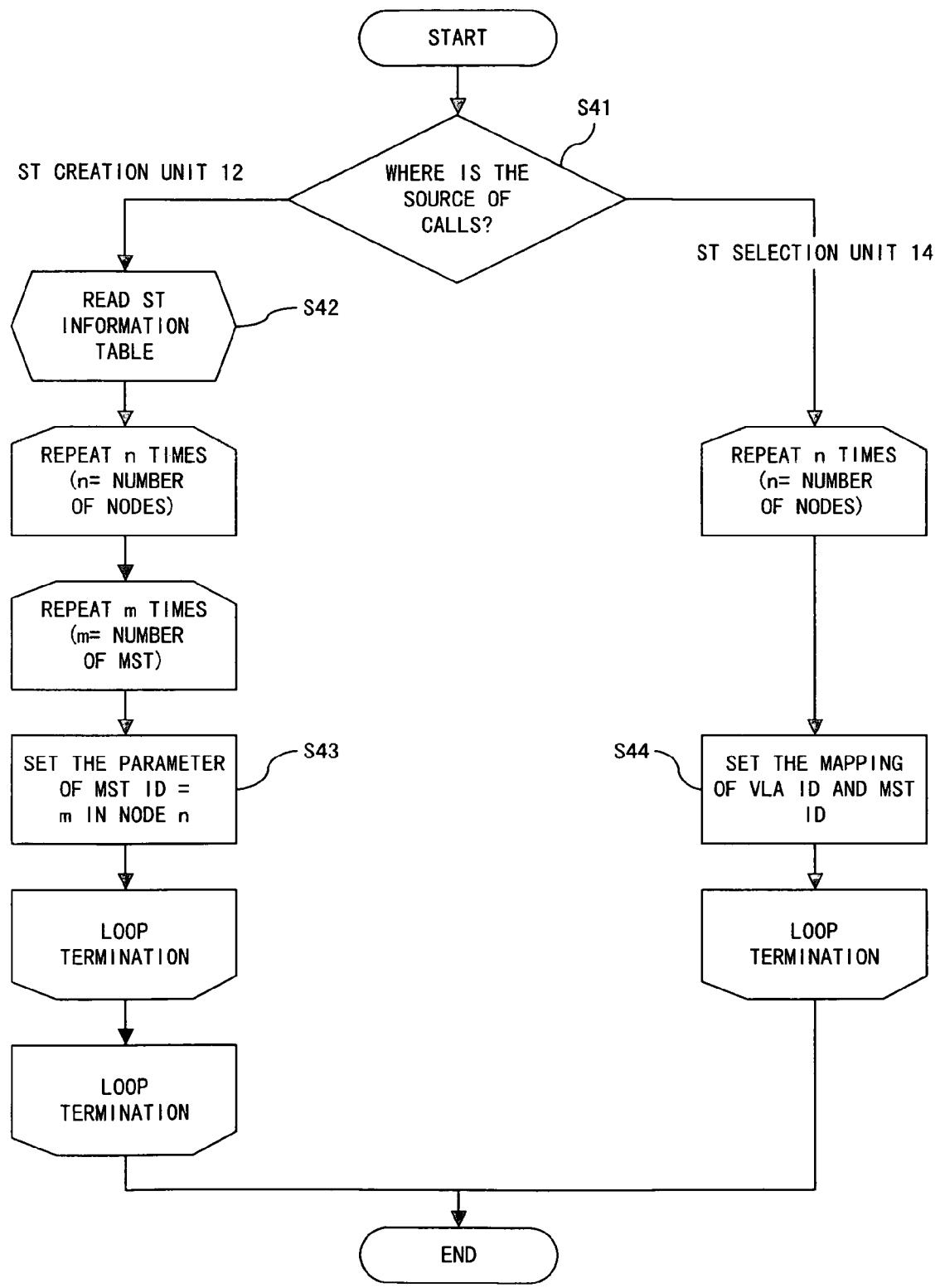
FIG. 14 is a flowchart showing the basic operations of the node setup unit.

FIG. 14 is a flowchart showing the basic operations of the node selection unit 15. This flowchart shows the processes in step S3 and S8 in FIG. 11 in detail.

In step S41, the call source of the node selection unit 15 is investigated. If the call is from the spanning tree creation unit 12, the processes in step S42 to S43 are performed, and if the call is from the spanning tree selection unit 14, the process in step S44 is performed.

In step S42, spanning tree information which expresses the plurality of spanning trees stored in the spanning tree information table 13 is obtained. Here, information which expresses the "forward/block" of each input/output port in each node is stored in the spanning tree information table 13 for each spanning tree. In step S43, information expressing each spanning tree is set in each node. For example, "port cost=1" is set in forwarding ports and "port cost=65535" is set in blocked ports.

On the other hand, in step S44, mapping information for the virtual LAN identifier (VLANID) and the spanning tree identifier (MSTID) is set in each node. Here, this mapping information is that which was generated in step S36 in FIG. 13.

In this way, node setup unit 15 provides information required to create the virtual LAN in each node. At this time, information from the node setup unit 15 is transmitted to each node by DCN, for example.

Next are explanations of the embodiments according to the present invention.

First Embodiment

A network administration system 1 according to a first embodiment comprises a priority setting unit 16 for attaching a priority level to each of the links between nodes. Here, the priority setting unit 16 sets the priority level of each link, for example, according to the instructions from the network administrator. Then, a spanning tree creation unit 12 creates a plurality of spanning trees in reference to the link priority level.

FIG. 15 is a diagram showing a configuration of a topology information table 11 according to the first embodiment. In FIG. 15, the bandwidths, transmission delay time, and usage costs are, for example, stored as the "parameter". In addition, the parameter regarding priority level is set as a "priority level flag" by the priority setting unit 16.

When the network administration system 1 is booted, the priority setting unit 16 determines the priority level flag of each link in the topology information table 11 shown in FIG. 15. For example, "1" is attached to links with a high priority level, and "0" is attached to other links as the priority level flag.

The priority level of each link is, for example, specified by the network administrator. The priority level can be determined by the "parameter" set for each link, as well. In this case, the priority level of each link can be determined by calculating the average value of the "parameter" as the threshold and comparing the "parameter" of each link to the average value. For example, if the bandwidth is set as the parameter of each link, a high priority level (priority level flag=1) is attached to links which have a larger bandwidth than the average bandwidth. In addition, if the transfer delay time or usage cost is set as the parameter of each link, a high priority level is attached to links which have a transmission delay time or usage cost lower than the average value.

One example is explained. Here, the "parameter" shown in FIG. 16A is presumed to be set in the topology information table 11. The "priority level flag" is to be written by the priority setting unit 16, and at this time, nothing has yet been written. The bandwidth of each link, in units of Mbps, is set as the "parameter". Under these conditions, the priority setting unit 16 calculates the average value of the parameter of each link and obtains "average bandwidth=4.4 Mbps". Here, after comparison between the average bandwidth and the bandwidth of each link, the link between nodes A and B, the link between nodes A and C, and the link between nodes B and C are larger than the average bandwidth, respectively. Therefore, "priority level flag=1" is attached to these three links, and "priority level flag=0" is attached to the other links. As a result, the topology information table 11 is updated as shown in FIG. 16B. After the priority level flag of each link is determined, the processing of priority setting unit 16 is completed.

After the priority level of each link is determined as explained above, the spanning tree creation unit 12 creates a plurality of spanning trees in reference to these link priority levels.

In other words, the spanning tree creation unit 12 first reads the topology information table 11 in FIG. 16B and extracts the links to which "priority level flag=1" is attached and the nodes located on each end of the links with high priority. Hereinafter, a group wherein the elements are the links and nodes extracted in this way is called "SET A". Incidentally, the network topology configured by SET A is as shown in FIG. 17A. Topology information for SET A is as shown in FIG. 18A, as well.

Next, the spanning tree creation unit 12 selects one root node out of the nodes belonging to SET A. A root node is, for example, selected randomly. Then, a spanning tree is created within the SET A based on this selected root node. Here, node A is selected as the root node, as shown in FIG. 18B. Subsequently, when the spanning tree is created within the SET A based on the node A, the tree shown in FIG. 17B is obtained. At this time, the information which expresses this spanning tree is as shown in FIG. 18C. The creation of a spanning tree within a network connecting a plurality of nodes per se is a publicly-known technology.

In addition, the spanning tree creation unit 12 adds each node which is not comprised in the SET A to the spanning tree created within the SET A. At this time, the nodes which should be added are connected individually to the spanning tree, using the links with the smallest costs. For example, in a case wherein node D is added to the spanning tree shown in FIG. 17B, node D is physically connected to both node A and node C, as shown in FIG. 1. However, as shown in FIG. 17C, while the link cost between nodes A and D is "10", the link cost between nodes C and D is "30". Therefore, in this case, node D is added to the spanning tree by being connected to node A. As a result, the spanning tree shown in FIG. 17D is obtained. The information which expresses this spanning tree is as shown in FIG. 18D, and is stored in spanning tree information table 13. This procedure is actualized by, for example, Prim algorithm and Kruskal algorithm.

There can be a case where a spanning tree cannot be created solely by the elements belonging to the SET A, when the SET A is extracted, or in other words, there can be a case where nodes which cannot be reached from the root node may exist within the SET A, when the root node is selected out of the plurality of nodes belonging to the SET A and the dijkstra algorithm or the like is applied within the SET A. Configurations such as this are sometimes called non-connected structure. In this case, the spanning tree creation unit 12 first interconnects elements within the SET A which are not interconnected, supplementing nodes and links not comprised in the SET A. Then, a spanning tree is created within the SET A. This procedure is actualized, for example, by repeating the process for connecting the spanning tree comprising the root node and nodes within the SET A, which are not connected to the tree, with the smallest-cost path obtained by the dijkstra algorithm or the like applied to the entire topology, until a node which is not connected to the tree including the root node does not exist, and making the resultant tree as the SET A. The procedures following the obtainment of the SET A through this method are as explained earlier.

The spanning tree creation unit 12 creates a plurality of spanning trees by repeating the procedure above. Here, the processing in spanning tree creation unit 12 stops when a predetermined number of spanning trees are created, or when a spanning tree which differs from previously created spanning trees is not created even when the process for creating spanning trees is repeated a predetermined number of times (for example, 50 times).

The process for selecting one spanning tree out of a plurality of spanning trees according to a virtual LAN order, and the process for setting the mapping information of the selected spanning tree and the requested virtual LAN in each node is as explained earlier.

In this way, in the first embodiment, a plurality of spanning trees are created based on the priority level of each link, and a virtual LAN is mapped to the spanning tree selected from the plural spanning trees. Therefore, if the priority level of each link is specified by the network administrator, the virtual LAN traffic can be transferred using the links intended by the network administrator. In addition, if the priority level of each link is determined based on bandwidth, communication resources can be efficiently utilized. Furthermore, if the priority level of each link is determined based on transmission delay time or usage cost, a virtual LAN which has a small transmission delay, or a virtual LAN which has a low usage cost can be realized.

Figure 19:
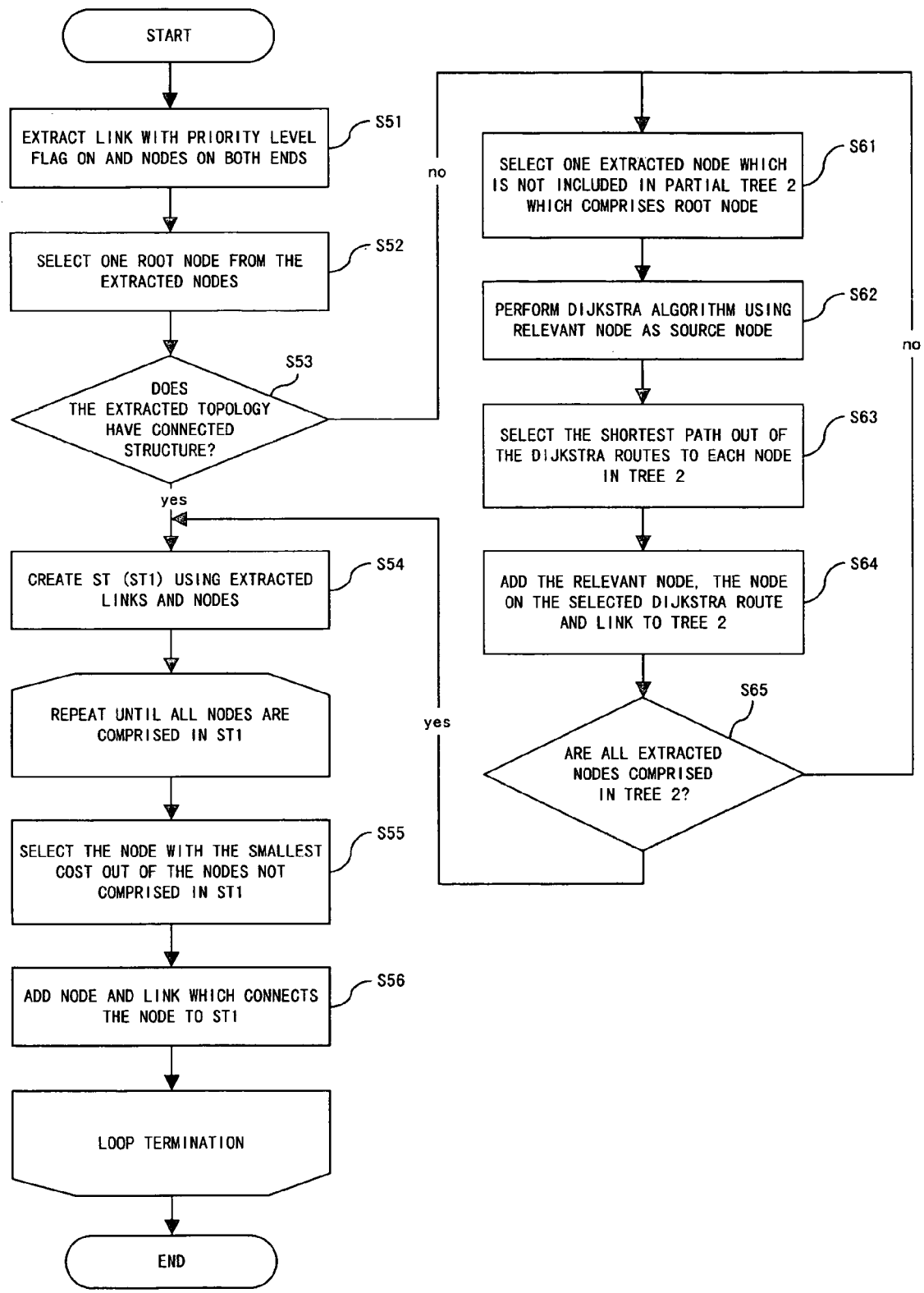
FIG. 19 is a flowchart showing the main operations of the spanning tree creation unit according to the first embodiment.

FIG. 19 is a flowchart showing the main operations of the spanning tree creation unit 12 in the first embodiment. The processes in this flowchart correspond to steps S13 and S14 in the basic operations of the spanning tree creation unit 12 shown in FIG. 12. In addition, the other operations of the spanning tree creation unit 12 in the first embodiment adhere to FIG. 12.

In step S51, links wherein the priority level flag in the topology information table 11 is "1 (ON)" and the nodes on both ends of the links are extracted. In step S52, one root node is selected out of the plurality of extracted nodes. In step S53, whether or not the topology comprising the extracted links and nodes are connected structures is investigated.

If the topology above is a connected structure, a spanning tree is created using the extracted links and nodes in step S54. Hereinafter, the spanning tree created in step S54 is referred to as "ST1". Then, the processes in steps S55 and S56 are repeatedly performed until all of the nodes are comprised in the spanning tree ST1.

In step S55, the node with the smallest cost from the spanning tree ST1 is selected out of the nodes which are not comprised in the spanning tree ST1. In step S56, the node selected in step S55 and the link which connects the selected node and the spanning tree ST1 are added to the spanning tree ST1.

If the topology above is not a connected structure, a state wherein each of the nodes extracted in step S51 is connected is generated by performing steps S61 to S65. Specifically, in Step S61, one node which is not comprised in the spanning tree including the root node (hereinafter, partial tree) is selected. In step S62, a dijkstra calculation is performed with the selected node as the source node. In step S63, the shortest route is detected out of the dijkstra routes to each node comprised in the partial tree. In step S64, this node, the node on the selected dijkstra route, and the links comprising the selected dijkstra route are added to the partial tree. Step S65 is provided for the repetition of steps S61 to S64 until all of the nodes extracted in step S51 are comprised in the partial tree.

In this way, the spanning tree creation method in the first embodiment creates a spanning tree which uses high-priority links.

Figure 20:
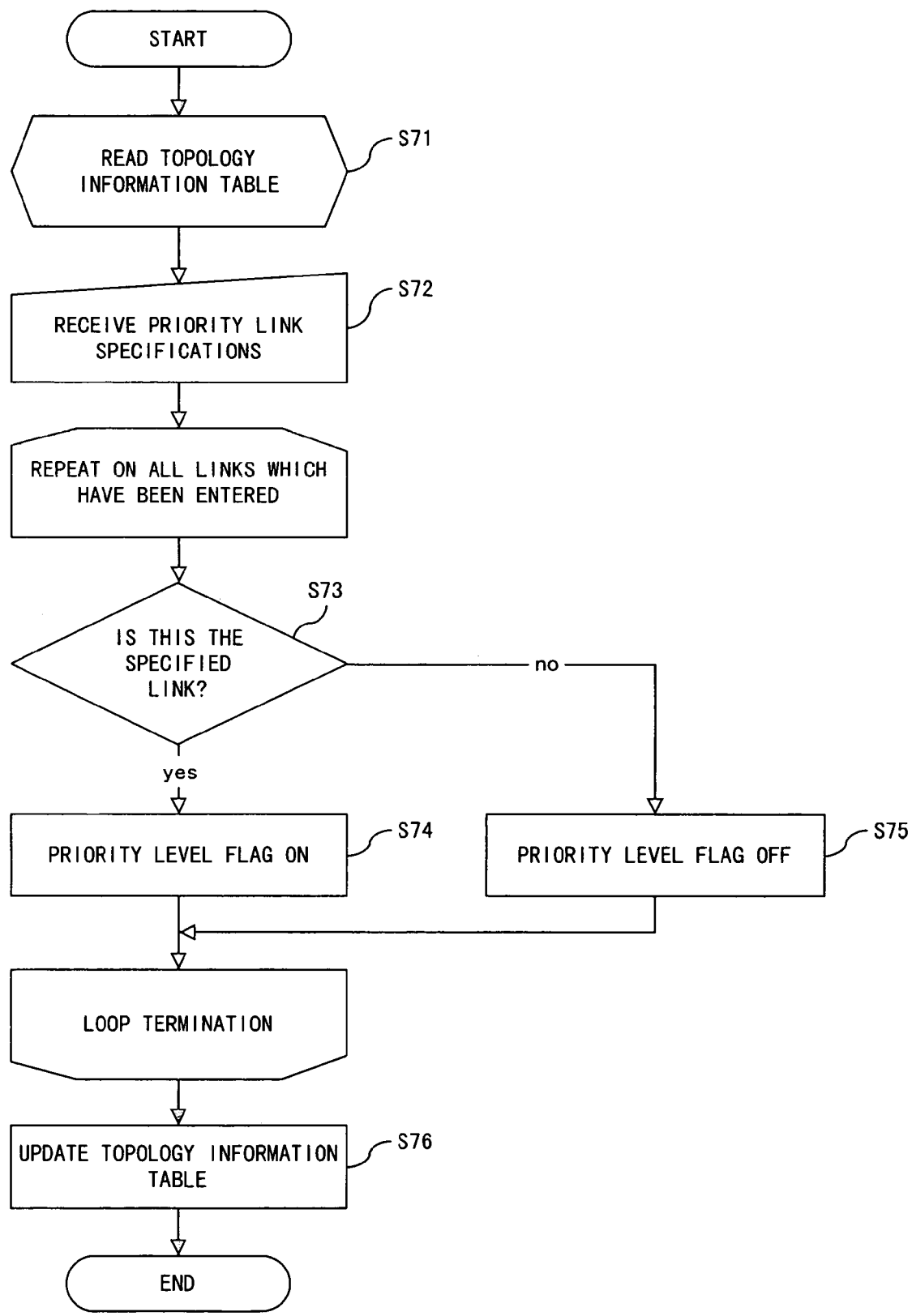
FIG. 20 to FIG. 23 are flowcharts showing the operations of the priority setting part.

FIG. 20 is a flowchart (1) showing the operations of the priority setting unit 16. Topology information table 11 is referred to in step S71. In step S72, the priority setting unit 16 awaits input from the network administrator. Here, it is presumed that the network administrator specifies one or more high-priority links out of all of the links.

The processes in step S73 to 75 are performed for each link registered in the topology information table 11. In step S73, whether or not the link is the link specified by the network administrator is checked. If it is the link specified by the network administrator, in step S74, "1 (ON)" is added as the priority level flag for this link. On the other hand, if it is not, in step S75, "0 (OFF)" is added as the priority level flag for this link. Then, in step S76, the topology information table 11 is updated according to the result of step S73 to S75.

In this way, the priority setting unit 16 sets the priority level of each link according to instructions from the network administrator, when the operations in this flowchart are performed.

Figure 21:
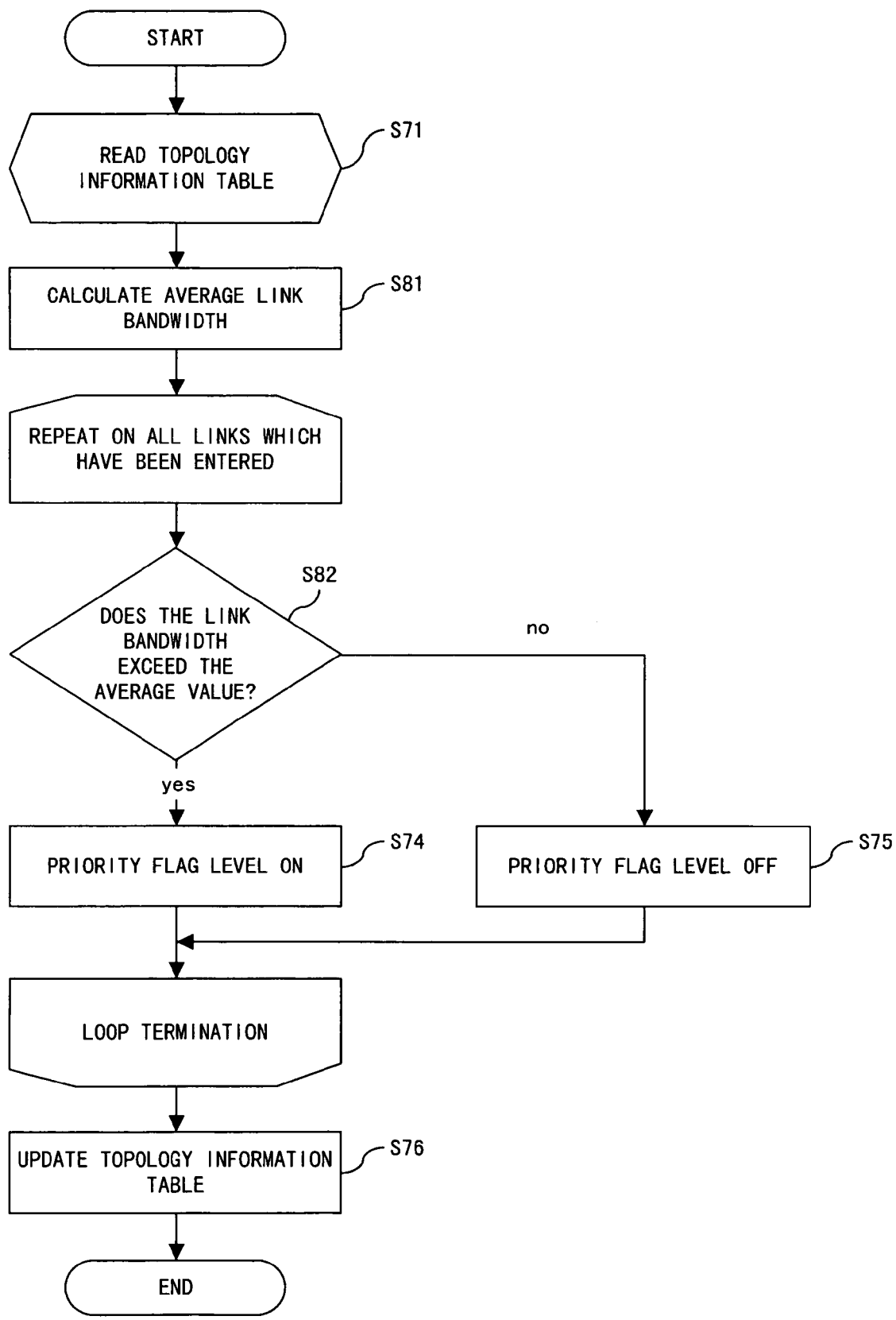

FIG. 21 is a flowchart (2) showing the operations of the priority setting unit 16. The operations in this flowchart are performed under the premise that the bandwidth of each link is set in advance in the topology information table 11. In addition, although the operations in this flowchart are basically the same as the operations shown in FIG. 20, steps S81 and S82 are performed in place of steps S72 and S73 in FIG. 20.

In step S81, the average value of the bandwidths of each link is calculated. In addition, in step S82, whether or not the bandwidth of each link is larger than the average bandwidth is determined individually. Then, "priority level flag=1 (ON)" is attached to links which have a bandwidth larger than the average bandwidth, and "priority level flag=0 (OFF)" is attached to the other links.

In this way, the priority setting unit 16 sets the link priority level based on the bandwidth of each link.

Figure 22:
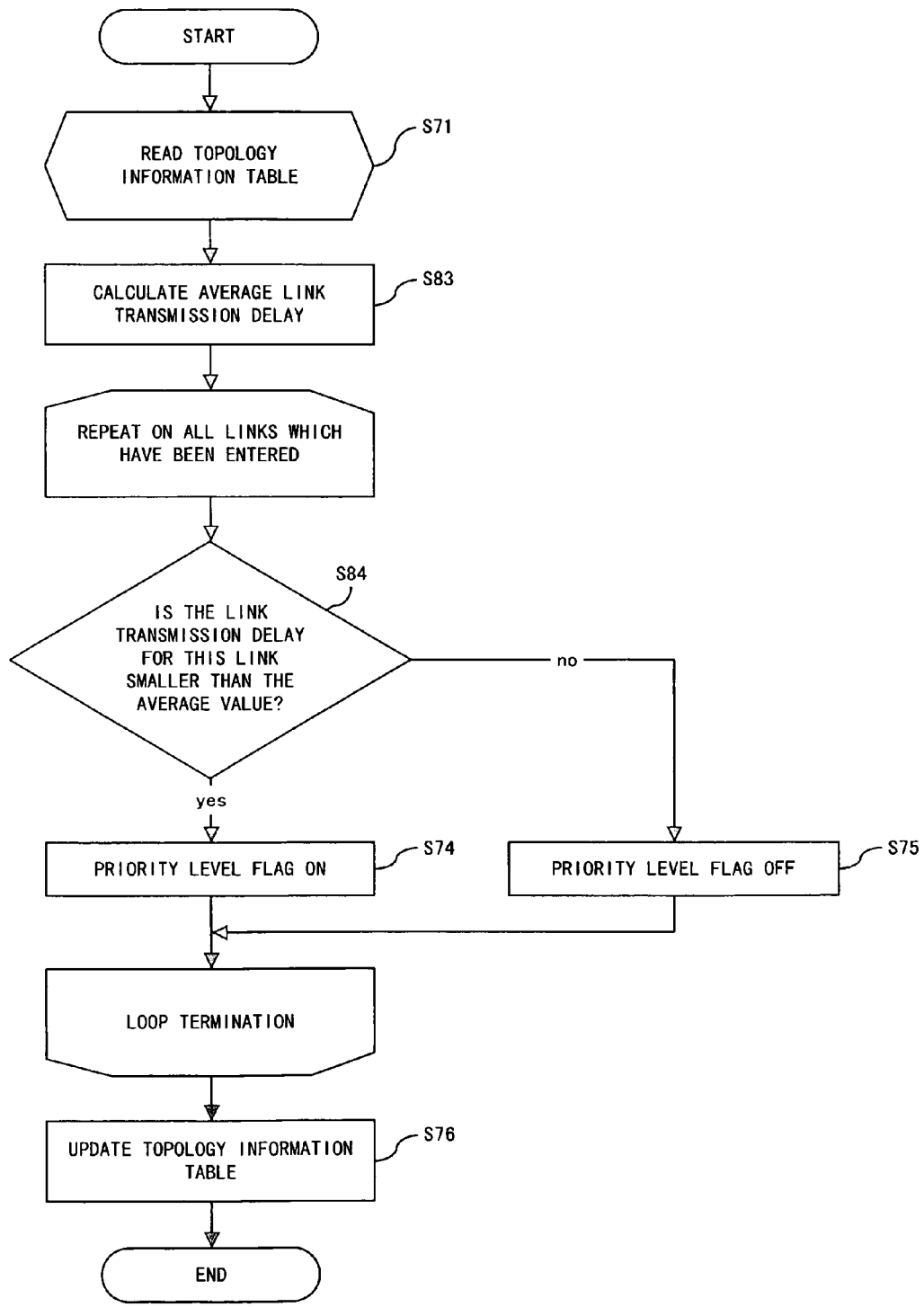

FIG. 22 is a flowchart (3) showing the operations of the priority setting unit 16. The operations in this flowchart are performed under the premise that the transmission delay time of each link is set in advance in the topology information table 11. In addition, although the operations in this flowchart are basically the same as the operations shown in FIG. 20, steps S83 and S84 are performed in place of steps S72 and S73 in FIG. 20.

In step S83, the average value of the transmission delay time of each link is calculated. In step S84, whether or not the transmission delay time of each link is larger than the average transmission delay time is determined individually. Then, "priority level flag=1 (ON)" is attached to links which have a transmission delay time smaller than the average transmission delay time, and "priority level flag=0 (OFF)" is attached to the other links.

In this way, the priority setting unit 16 sets the link priority level based on the transmission delay time of each link.

Figure 23:
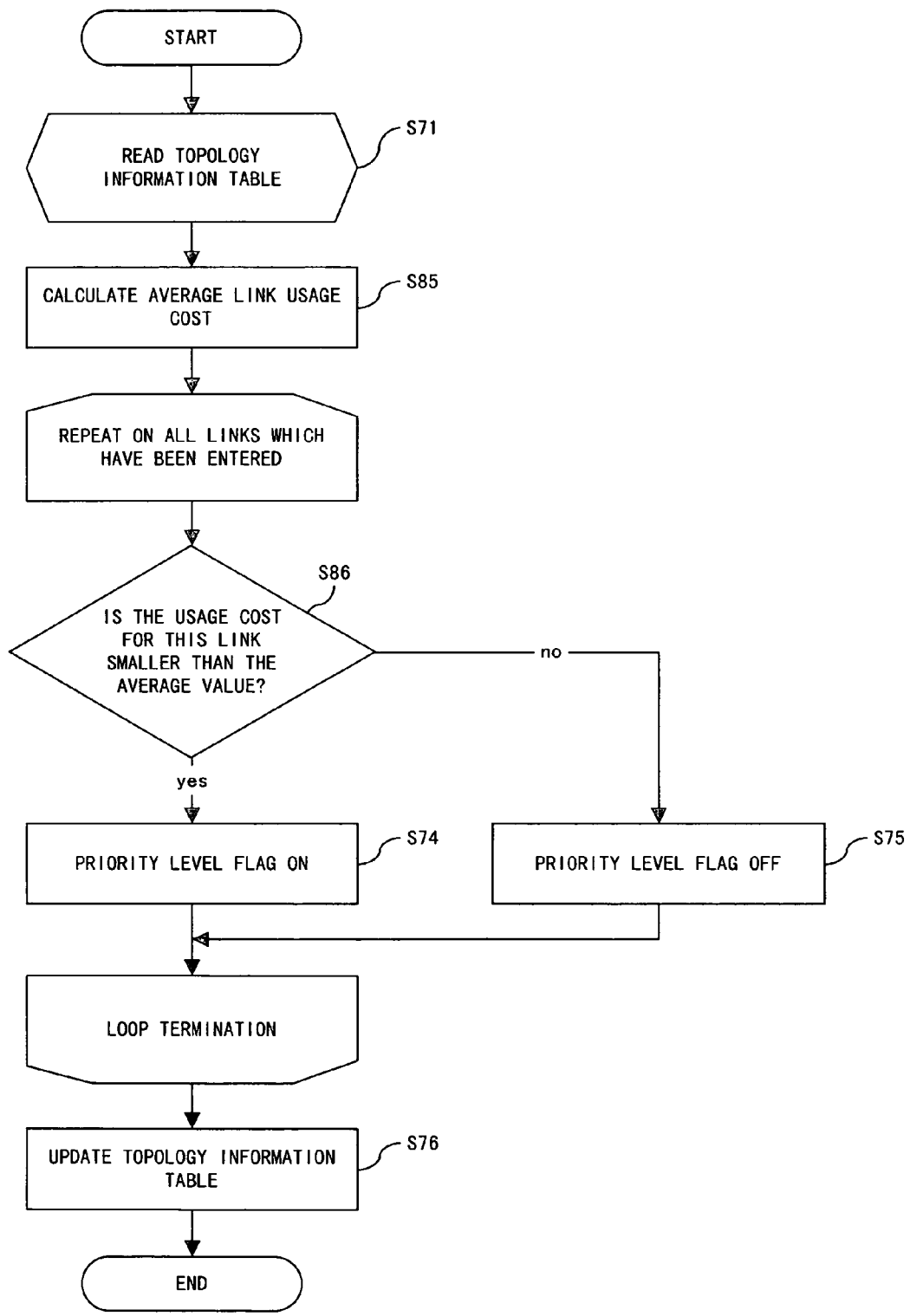

FIG. 23 is a flowchart (4) showing the operations of the priority setting unit 16. The operations in this flowchart are performed under the premise that the usage cost of each link is set in advance in the topology information table 11. In addition, although the operations in this flowchart are basically the same as the operations shown in FIG. 20, steps S85 and S86 are performed in place of steps S72 and S73 in FIG. 20.

In step S85, the average value of the usage cost of each link is calculated. In step S86, whether or not the usage cost of each link is larger than the average usage cost is determined individually. Then, "priority level flag=1 (ON)" is attached to links which have a usage cost lower than the average usage cost, and "priority level flag=0 (OFF)" is attached to the other links.

In this way, the priority setting unit 16 sets the link priority level based on the usage cost of each link.

Second Embodiment

Spanning tree creation unit 12 comprised in the network administration system 1 in a second embodiment takes into consideration the number of times each link has been used, respectively, to create a spanning tree, when creating a plurality of spanning trees.

FIG. 24A is a diagram showing a configuration of the topology information table 11 in the second embodiment. Here, bandwidth is stored, respectively, as the "parameter" for each link, and the "priority level flag" of each link is determined based on this parameter. The "priority level flag" is, for example, set by the priority setting unit 16, as explained in the first embodiment. In addition, the topology information table 11 in the second embodiment manages the "link selection count" which indicates the number of times each link has been selected, respectively, to create a spanning tree.

The spanning tree creation unit 12 refers to the topology information table 11 when creating a plurality of spanning trees. At this time, the spanning tree creation unit 12 creates a plurality of spanning trees so that links which are not comprised in any of the spanning trees do not exist, while referring to link priority level. In other words, a plurality of spanning trees is created so that all links are comprised in any of the spanning trees at least one time. This creation process is actualized, for example, by the following procedures.

When creating the first spanning tree (in other words, the spanning tree identified by "MSTID=1"), the links to which "priority level flag=1" is attached and the nodes connected to each end of the links are preferentially used, as in the first embodiment. Then, for example, the spanning tree shown in FIG. 17D is created, as in the first embodiment, the "link selection count" for links comprised in this spanning tree (namely, the link between nodes A and B, the link between nodes A and C, and the link between nodes A and D) is incremented in the topology information table 11. As a result, the topology information table 11 is updated to the state shown in FIG. 24B. This operation is called "phase 1".

Figure 25:
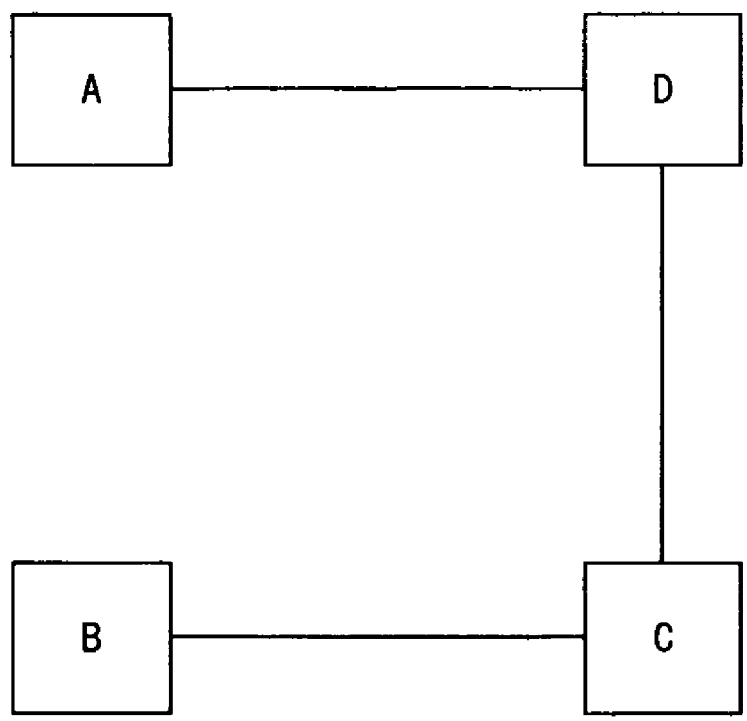
FIG. 25 is an example of a spanning tree created by taking into consideration the number of times link selection is made.

Next, when creating the second spanning tree (in other words, the spanning tree identified by "MSTID=2"), the "link selection count" in the topology information table 11 shown in FIG. 24B is referenced. Specifically, each link with "link selection count=0" and the nodes connected to each end of the links are extracted from the topology information table 11. SET A which includes these links and nodes as elements is defined, and a spanning tree is created based on this SET A, as in the first embodiment. When the spanning tree shown in FIG. 25 is created, the "link selection count" for links comprised in this spanning tree (namely, the link between nodes A and D, the link between nodes B and C, and the link between nodes C and D) is incremented in the topology information table 11. As a result, the topology information table 11 is updated to the state shown in FIG. 24C. This operation is called "phase 2". The operation of the phase 2 is performed repeatedly until the "link selection count" of all of the links registered to the topology information table 11 is "1" or more.

Subsequently, the process moves on to a phase 3. In the phase 3, a plurality of spanning trees are created by repeating the same procedure as phase 1. At this time, the "link selection count" in the topology information table 11 is not updated if a spanning tree which is the same as a spanning tree created previously is created. If a predetermined number of spanning trees which differ from each other are created, or if new spanning trees are not created even after repeating the procedure a predetermined number of times (for example, 50 times), phase 3 is completed.

The process for selecting one spanning tree out of a plurality of spanning trees according to a virtual LAN order, and the process for setting the mapping information of the selected spanning tree and the requested virtual LAN in each node are as explained above.

In this way, in the second embodiment, each link is comprised in any of the spanning trees at least one time, taking into consideration the link priority level, when creating a plurality of spanning trees. In other words, links which are not selected as elements of a spanning tree do not exist, and thus, disproportionate use of the network is prevented.

Figure 26:
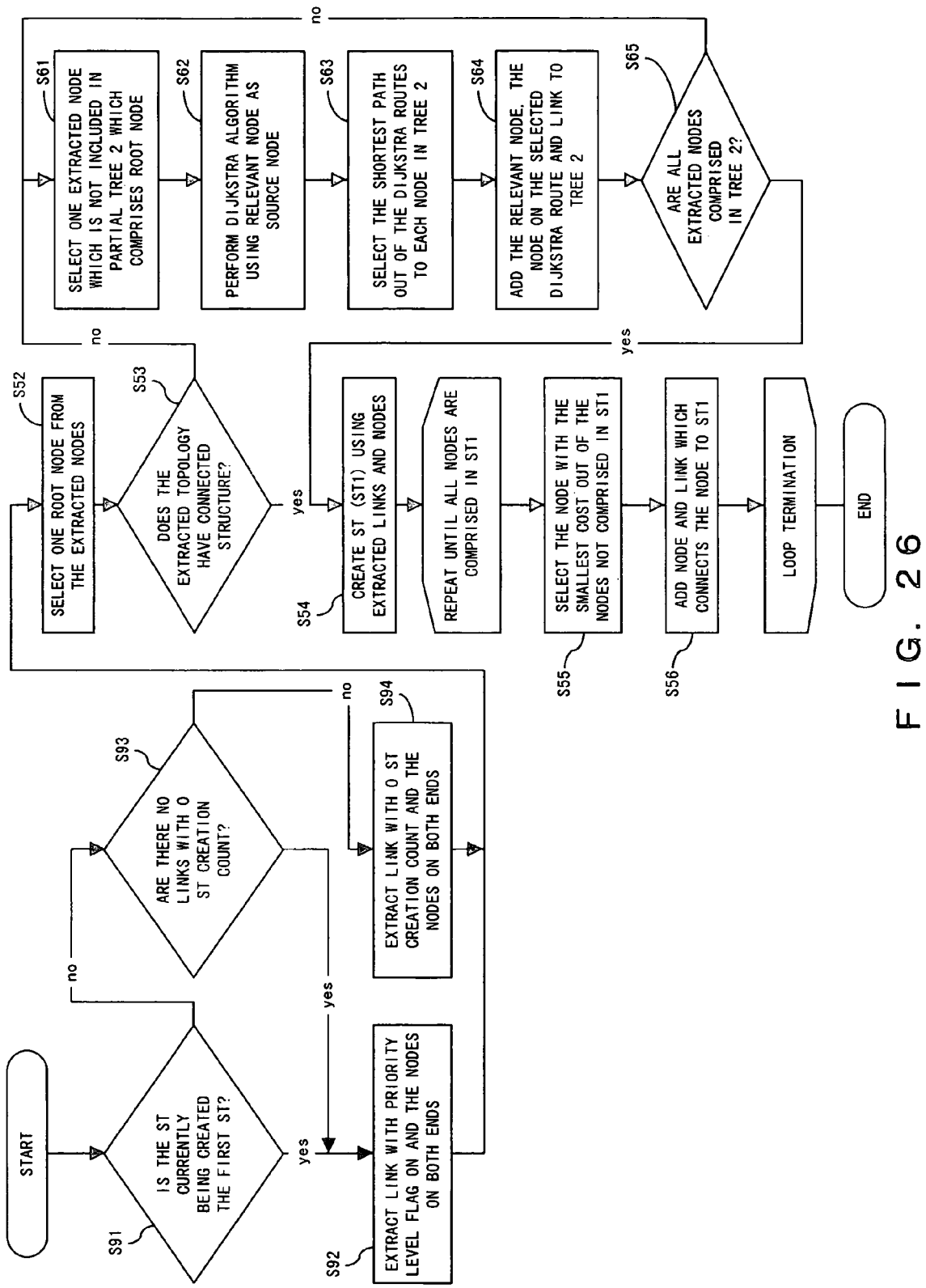
FIG. 26 is a flowchart showing the main operations of the spanning tree creation unit according to a second embodiment.

FIG. 26 is a flowchart showing the main operations of the spanning tree creation unit 12 in the second embodiment. The processes in this flowchart correspond to steps S13 and S14 in the basic operations of the spanning tree creation unit shown in FIG. 12. The other operations of the spanning tree creation unit 12 in the second embodiment are as according to FIG. 12. In addition, the processes of steps S52 to 56 and S61 to 65 are as explained in reference to FIG. 19 in the first embodiment.

In step S91, whether or not the spanning tree which is to be created is the first spanning tree is checked. If the first spanning tree is to be created, each link to which "priority level flag=1" is attached and the nodes on both ends of the links are extracted. The subsequent operations are the same as that in the first embodiment.

When the second and subsequent spanning tree is to be created, whether or not there is a link which has "link selection count=0" in the topology information table 11 exist is checked in step S93. Then, if one or more links which have "link selection count=0" exist, these links with "link selection count=0" and the nodes on both ends of the links are extracted in step S94. The subsequent operations are the same as that in the first embodiment. On the other hand, if there are no links with "link selection count=0" when creating a second and subsequent spanning tree, step S92 is performed.

In this way, in the second embodiment, each link is comprised in any of the spanning trees at least one time.

Third Embodiment

In a third embodiment, when selecting the spanning tree to which the requested virtual LAN is mapped out of a plurality of spanning trees created beforehand, the spanning tree with the smallest number of links in its path is selected in a case where the virtual LAN is mapped. In other words, the spanning tree with the smallest total hop count in the path the virtual LAN traffic flows through is selected.

FIG. 27 is an example of the topology information table 11 in the third embodiment. Here, "bandwidth" refers to link bandwidth. In addition, "bandwidth in use" is the bandwidth which is currently and actually being used, or bandwidth which is already assigned to the virtual LAN. For example, the record in the first line of this table indicates that the link cost between nodes A and B is "10", the bandwidth is "5", and the bandwidth being used is "0.5". The unit for "bandwidth" and "bandwidth in use" is, for example, "Mbps".

"Bandwidth in use" is updated by the network administrator when, for example, a new virtual LAN has been mapped and when the virtual LAN which had been mapped is deleted. A device for dynamically monitoring the usage conditions of the network can be provided and the information collected by this device can be written in "Bandwidth in use".

Next, the process for selecting one spanning tree out of the plurality of spanning trees created beforehand in the third embodiment is explained. "Bandwidth in use"

The spanning tree selection unit 14 provides a hop count management table shown in FIG. 28A. Here, this table manages the hop count when the virtual LAN is mapped using the spanning tree.

In addition, the spanning tree selection unit 14 determines whether or not the requested virtual LAN can be mapped to each spanning tree registered to the spanning tree information table 13, respectively, in reference to the topology information table 11 in FIG. 27. Whether or not mapping is possible is determined, for example, by determining whether or not the total bandwidth obtained by adding the "requested bandwidth" to the "bandwidth is use" of each link exceeds the "bandwidth" of the link, in regards to the links being used under the premise that the requested virtual LAN is mapped to the selected spanning tree. At this time, mapping is determined to be possible if the total bandwidth does not exceed the "bandwidth", and not possible if the "bandwidth" is exceeded. If the mapping of the requested virtual LAN is deemed possible, the number of links within the spanning tree, through which the virtual LAN traffic flows, is written to the hop count management table as "total hop count". If the requested virtual LAN cannot be mapped, the hop count management table is not updated.

The spanning tree selection unit 14 determines the "total hop count" for all of the spanning trees registered to the spanning tree information table 13, as described above, and the spanning tree with the smallest "total hop count" is selected as the spanning tree to which the requested virtual LAN is mapped.

If the entries in the hop count management table remain blank even when the process above has been performed on all of the spanning trees registered in the spanning tree information table 13, it is assumed that a spanning tree capable to which the requested virtual LAN can be mapped does not exist, and a message indicating this is output (for example, as an error message to the network administrator).

One example is explained. Here, it is presumed that the spanning tree information shown in FIG. 29 is stored in the spanning tree information table 13. In other words, the three spanning trees shown in FIG. 30A through 30C are created. In addition, the virtual LAN order requested by the user comprises information specifying the node which accommodates the user, and information indicating bandwidth. In the example below, it is presumed that the user requesting the virtual LAN has three access points and these access points are accommodated in nodes B, C, and D, respectively. Furthermore, it is presumed that the user requests "bandwidth=0.5 Mbps" for the path connecting nodes B, C, and D. The requested bandwidth can be the bandwidth requested in full-mesh between the user accommodated nodes, and the bandwidths requested between user accommodated nodes do not necessary have to be the same.

Under these conditions, the spanning tree selection unit 14 first selects a spanning tree identified by "MSTID=1" from the spanning tree information table 13 in FIG. 29. In this case, if the virtual LAN above is to be mapped to this spanning tree, the traffic of this virtual LAN will flow through the link between nodes A and B, the link between nodes A and C, and the link between the nodes A and D. Therefore, whether or not mapping is possible is determined for these three links. In this example, the "bandwidth in use" for the three links above are "0.5", "1.0", and "0.8", respectively, as shown in FIG. 27. Therefore, if "required bandwidth (=0.5)" is added to the "bandwidth in use", the total bandwidth of each link would be "1.0", "1.5", and "1.3", respectively. Then, in regards to the link between nodes A and D, the total bandwidth exceeds the "bandwidth (=1.0)" of this link and it is determined that the requested virtual LAN cannot be mapped. In this case, nothing is written to the hop count management table.

Subsequently, the spanning tree selection unit 14 selects a spanning tree which is identified by "MSTID=2". In this case, if the virtual LAN above is to be mapped to this spanning tree, the traffic of this virtual LAN will flow through the link between nodes B and C and the link between nodes C and D only. Therefore, whether or not this virtual LAN can be mapped is determined in regards to these two links. In this example, the "bandwidth in use" for the two links above is "2.5" and "0.1", respectively. Thus, if "requested bandwidth (=0.5)" is added to these "bandwidth in use", the total bandwidth for each link is "3.0" and "0.6", respectively. Then, in regards to these two links, it is determined that each total bandwidth is smaller than the "bandwidth" of their respective corresponding links ("5" and "1", respectively) and the requested virtual LAN can be mapped. In this case, "total hop count=2" is written to the hop count management table.

Furthermore, the spanning tree selection unit 14 performs the same process for "MSTID=3". In this case, if the virtual LAN above is to be mapped to this spanning tree, its virtual LAN traffic will flow through the link between nodes A and B, the link between nodes A and C, and the link between nodes C and D, and it is determined that the requested virtual LAN can be mapped. Then, "Total hop count=3" is written to the hop count management table. As a result, the hop count management table is updated to the state shown in FIG. 28B.

The spanning tree selection unit 14 selects the spanning tree with the smallest "total hop count" in reference to the hop count management table shown in FIG. 28B. In this example, the spanning tree identified by "MSTID=2" is selected.

The process for creating a plurality of spanning trees and the process for setting the mapping information of the selected spanning tree and the requested virtual LAN in each node are as explained above.

In this way, in the third embodiment, the spanning tree with the smallest total hop count is selected and the virtual LAN is mapped to this spanning tree. Thus, virtual LAN services can be provided by the shortest path.

Fourth Embodiment

Although the spanning tree with the smallest total hop count within the path through which the newly added virtual LAN traffic flows is selected in the third embodiment, in the forth embodiment, the spanning tree with the smallest sum of increase in traffic volume (bandwidth) due to the addition of a new virtual LAN is selected.

The operation of the spanning tree selection unit 14 in the fourth embodiment is basically the same as in the third embodiment. However, the following operations are different.

The spanning tree selection unit 14 provides a bandwidth increase management table shown in FIG. 31A. This table manages the volume increase of the bandwidth to be used when mapping a new virtual LAN on the spanning tree.

The spanning tree selection unit 14 checks whether or not the requested virtual LAN can be mapped, respectively, in regards to each of the spanning trees registered to the spanning tree information table 13, as in the third embodiment. Then, if it is determined that the requested virtual LAN can be mapped, the total value of the increase in bandwidth due to the addition of this virtual LAN is written to the bandwidth increase management table as the "bandwidth increase". If the requested virtual LAN cannot be mapped, the bandwidth increase management table is not updated.

The spanning tree selection unit 14 determines the "bandwidth increase" for all of the spanning trees registered to the spanning tree information table 13, as explained above. Then, the spanning tree with the smallest "bandwidth increase" is selected as the spanning tree to which the virtual LAN should be mapped.

One example is explained. Here, it is presumed that the spanning tree information shown in FIG. 29 is stored in the spanning tree information table 13, as is in the third embodiment. In other words, the three spanning trees shown in FIG. 30A through 30C are created. In addition, the user requesting the virtual LAN is presumed to be accommodated in nodes B, C, and D, and furthermore, this user requests "bandwidth=0.5 (Mbps)" on the paths connecting nodes B, C, and D.

Under these conditions, the spanning tree selection unit 14 first selects a spanning tree identified by "MSTID=1" from the spanning tree information table 13 shown in FIG. 29. However, as explained in the third embodiment, the requested virtual LAN cannot be mapped to this spanning tree. Therefore, in this case, nothing is written to the bandwidth increase management table.

Next, the spanning tree selection unit 14 selects a spanning tree identified by "MSTID=2". Here, the spanning tree selection unit 14 calculates the "bandwidth increase" because the requested virtual LAN can be mapped to this spanning tree, as explained above. In this case, if the virtual LAN above is to be mapped to this spanning tree, the traffic of this virtual LAN will flow through two links (the link between nodes B and C and the link between nodes C and D). Here, the requested bandwidth of the user is "0.5 (Mbps)" and therefore, the sum of the increase in the bandwidth to be used due to the addition of this virtual LAN is "1.0 (Mbps)". This calculation result is written to the bandwidth increase management table.

In addition, the spanning tree selection unit 14 performs the same process for "MSTID=3". In this case, if the virtual LAN above is to be mapped to this spanning tree, the traffic of this virtual LAN will flow through three links (the link between nodes A and B, the link between nodes A and C, and the link between nodes C and D). Therefore, "bandwidth increase=1.5 (Mbps)" is written to the bandwidth increase management table. As a result, the bandwidth increase management table is updated to the state shown in 31B.

Subsequently, the spanning tree selection unit 14 selects the spanning tree with the smallest "bandwidth increase" in reference to the bandwidth increase management table shown in FIG. 31B. In this example, the spanning tree identified by "MSTID=2" is selected.

The process for creating a plurality of spanning trees and the process for setting the mapping information of the selected spanning tree and the requested virtual LAN in each node are as explained above.

Incidentally, if the bandwidth requested by the user in the virtual LAN order is the same for all of the paths as in the example above, the same spanning tree is selected in the third and fourth embodiments. However, if the bandwidth requested by the user differs according to path, different spanning trees may be selected in the third and fourth embodiments.

For example, it is presumed, in FIGS. 32A and 32B, that the user has three offices 1 to 3, and the office 1, 2 and 3 are accommodated in node G, node I and node C, respectively. In addition, the traffic between the office 2 and the office 3 is presumed to be heavy, and traffic between other offices light. In FIGS. 32A and 32B, the spanning tree is considered to be configured by solid lines and double lines. Furthermore, the double lines indicate the paths through which the virtual LAN traffic flows (in other words, virtual LAN topology).

In this case, in the spanning tree shown in FIG. 32A, the heavy-volume traffic between node C and node I is forwarded via nodes B, A, D, G, and H. In other words, a large bandwidth must be secured in each of the six links on this path. Therefore, in this case, the total sum of bandwidth necessary for mapping this virtual LAN is considerably large. For example, if the bandwidth shown in FIG. 32A is assigned to each of the six links, the total bandwidth will be "60 (Mbps)".

On the other hand, in the spanning tree shown in FIG. 32B, the heavy-volume traffic between node C and node I is forwarded via node F. In other words, a large bandwidth must be assigned to the two links between node C and node I, but a large bandwidth does not have to be assigned to the four links between node C and node G. Therefore, in this case, the total sum of bandwidth necessary for mapping this virtual LAN is comparably small. For example, if the bandwidth shown in FIG. 32B is assigned to each of the six links, the total bandwidth will be "28 (Mbps)".

In this example, the spanning tree selection unit 14 selects the spanning tree shown in FIG. 32B. The total hop count when the virtual LAN is mapped is both "6" regardless of the spanning tree being that shown in FIG. 32A or FIG. 32B. Therefore, in this case, these two spanning trees cannot be compared only by the "total hop count".

In the fourth embodiment, the spanning tree with the least communication resources assigned to each virtual LAN is selected and the virtual LAN is mapped to this spanning tree. Therefore, the volume of traffic flowing through the network is reduced, limited communication resources can be assigned to other virtual LANs, and thus, communication resources can be effectively utilized.

Fifth Embodiment

In a fifth embodiment, the spanning tree with the smallest variation in the usage rate of each link is selected. Therefore, although the operation of the spanning tree selection unit 14 in the fifth embodiment is basically the same as the third and fourth embodiment, the following operations differ.

The spanning tree selection unit 14 provides a variation management table shown in FIG. 33A. Here, this table manages the variation in usage rates of each link in the spanning tree.

The spanning tree selection unit 14 determines whether or not the requested virtual LAN can be mapped, respectively, in regards to each spanning tree registered to the spanning tree information table 13, as in the third and fourth embodiment. Then, if it is determined that the requested virtual LAN can be mapped, the variation in the usage rate of each link, under the premise that this virtual LAN is added, is written to the variation management table as the "variation". If the requested virtual LAN cannot be mapped, the variation management table is not updated.

The spanning tree selection unit 14 determines the "amount of variation" for all of the spanning trees, as explained above. Then, the spanning tree with the least "variation" is selected as the spanning tree to which the virtual LAN is mapped.

One example is explained. Here, it is presumed that the same spanning trees as that in the third and fourth embodiments are created, and the same virtual LAN is being requested. Therefore, the requested virtual LAN cannot be mapped to spanning tree identified by "MSTID=1" in this case, as well, and nothing is written to the variation management table for the tree.

Figure 34A:
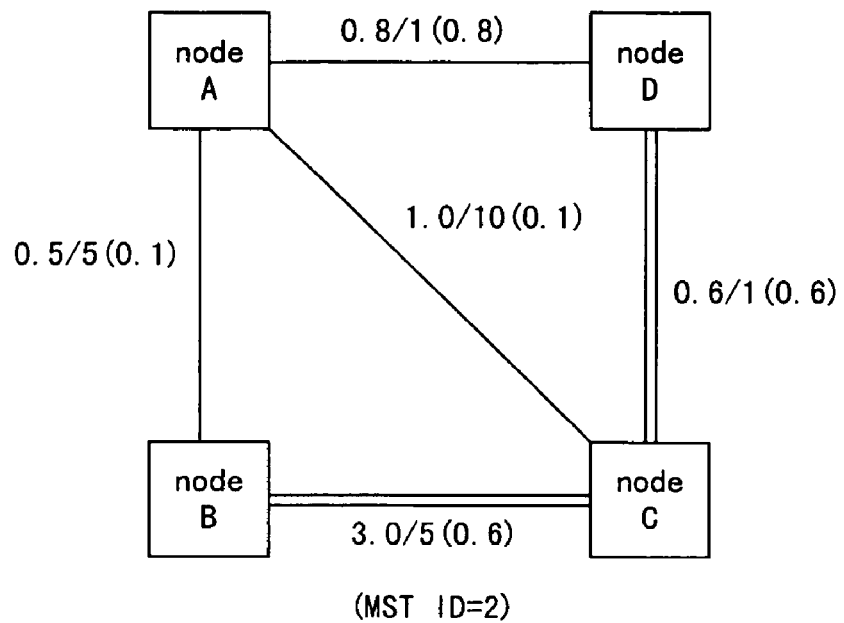
FIG. 34 is a diagram explaining the variations in link usage ratios.

Next, the spanning tree selection unit 14 selects a spanning tree identified by "MSTID=2", and calculates the "variation" when the requested virtual LAN is mapped to this spanning tree. Here, if the virtual LAN above is to be mapped to this spanning tree, the traffic of this virtual LAN will flow through two links (the link between nodes B and C, and the link between nodes C and D). Therefore, the usage rate of each link is as shown in FIG. 34A. Specifically, the calculations are as below, in reference to the spanning tree information table 13 shown in FIG. 29:

Link between nodes $A$ and $B$: $(0.5+0)\div5=0.1$

Link between nodes $A$ and $C$: $(1.0+0)\div10=0.1$

Link between nodes $A$ and $D$: $(0.8+0)\div1=0.8$

Link between nodes $B$ and $C$: $(2.5+0.5)\div5=0.6$

Link between nodes $C$ and $D$: $(0.1+0.5)\div1=0.6$

At this time, "VAR=0.0824" is obtained when the population variance of the usage rates is determined to calculate the "variation", and this value is written to the variation management table.

Figure 34B:
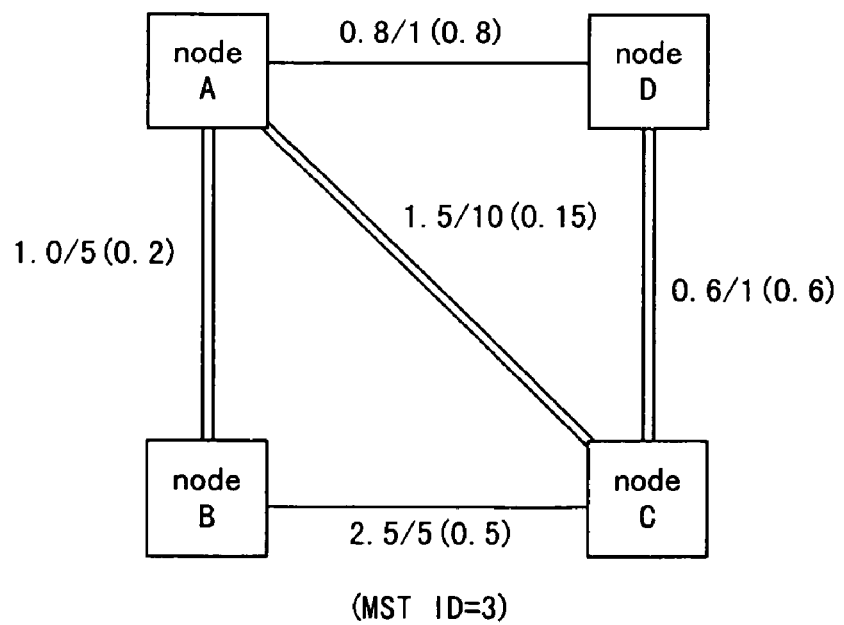

Furthermore, the spanning tree table 14 performs the same process for "MSTID=3" as well. In this case, if the virtual LAN above is to be mapped to this spanning tree, the traffic of this virtual LAN will flow through three links (the link between nodes A and B, the link between nodes A and C, and the link between nodes C and D). Therefore, the usage rate of each link is as shown in FIG. 34B. Specifically, the calculations are as below:

Link between nodes $A$ and $B$: $(0.5+0.5)\div5=0.2$

Link between nodes $A$ and $C$: $(1.0+0.5)\div10=0.15$

Link between nodes $A$ and $D$: $(0.8+0)\div1=0.8$

Link between nodes $B$ and $C$: $(2.5+0)\div5=0.5$

Link between nodes $C$ and $D$: $(0.1+0.5)\div1=0.6$

In this case, "VAR=0.06" is obtained as the "variation", and this value is written to the variation management table. As a result, the variation management table is updated as shown in FIG. 33B.

Next, the spanning tree selection unit 14 selects the spanning tree with the least "variation" in reference to the variation management table shown in FIG. 33B. In this example, the spanning tree identified by "MSTID=3" is selected.

The process for creating a plurality of spanning trees and the process for setting the mapping information of the selected spanning tree and the requested virtual LAN in each node are as explained above.

In addition, although the population variance is used when evaluating the variation in the usage rates of each link in the example above, the present invention is not necessary limited to this. For example, the variation can be evaluated using standard deviation.

Furthermore, the methods for detecting the usage rates of each link are not particularly limited. Therefore, for example, the bandwidth which should be newly assigned to each link can be added to the bandwidth already assigned to each link, and the usage rate of each link can be calculated based on the addition results. A device for dynamically monitoring the traffic volume of each link is provided, the bandwidth to be newly assigned to each link is added to the bandwidth corresponding to the traffic volume of each link detected by the device, and the usage rate of each link can be calculated based on the addition results, as well. Incidentally, the former method is considered preferable for services which ensure the bandwidth of each virtual LAN. On the other hand, the latter method is considered ideal when providing so-called best-effort services.

As described above, in the fifth embodiment, the spanning tree with the least variation (or variance) in link usage rates is selected, and the virtual LAN is mapped to this spanning tree. Therefore, situations wherein the virtual LAN cannot be mapped due to localized insufficient bandwidth are prevented, regardless of whether or not there is margin in bandwidth within the network. In other words, communication resources are used effectively.

Although methods for selecting the spanning tree based on "total hop count", "bandwidth increase" and "variation in link usage rates" have been explained in the third to fifth embodiments, the present invention is not necessarily limited to these means.

For example, the spanning tree with the smallest sum of transmission delay time of links in the path through which the virtual LAN traffic flows when a requested virtual LAN is mapped can be selected. In this case, it is preferable that the transmission delay time of each link is registered to the topology information table 11. Then, the total transmission delay time within the spanning tree can be obtained by extracting the transmission delay times corresponding to the relevant links from the table and adding the extracted values.

In addition, the spanning tree with the smallest sum of usage cost (communication fee) of links in the path through which the virtual LAN traffic flows when a requested virtual LAN is mapped can be selected. In this case, it is preferable that the usage cost of each link is registered to the topology information table 11. Then, the total usage cost within the spanning tree can be obtained by extracting the usage costs corresponding to the relevant links from the table and adding the extracted values.

Figure 35:
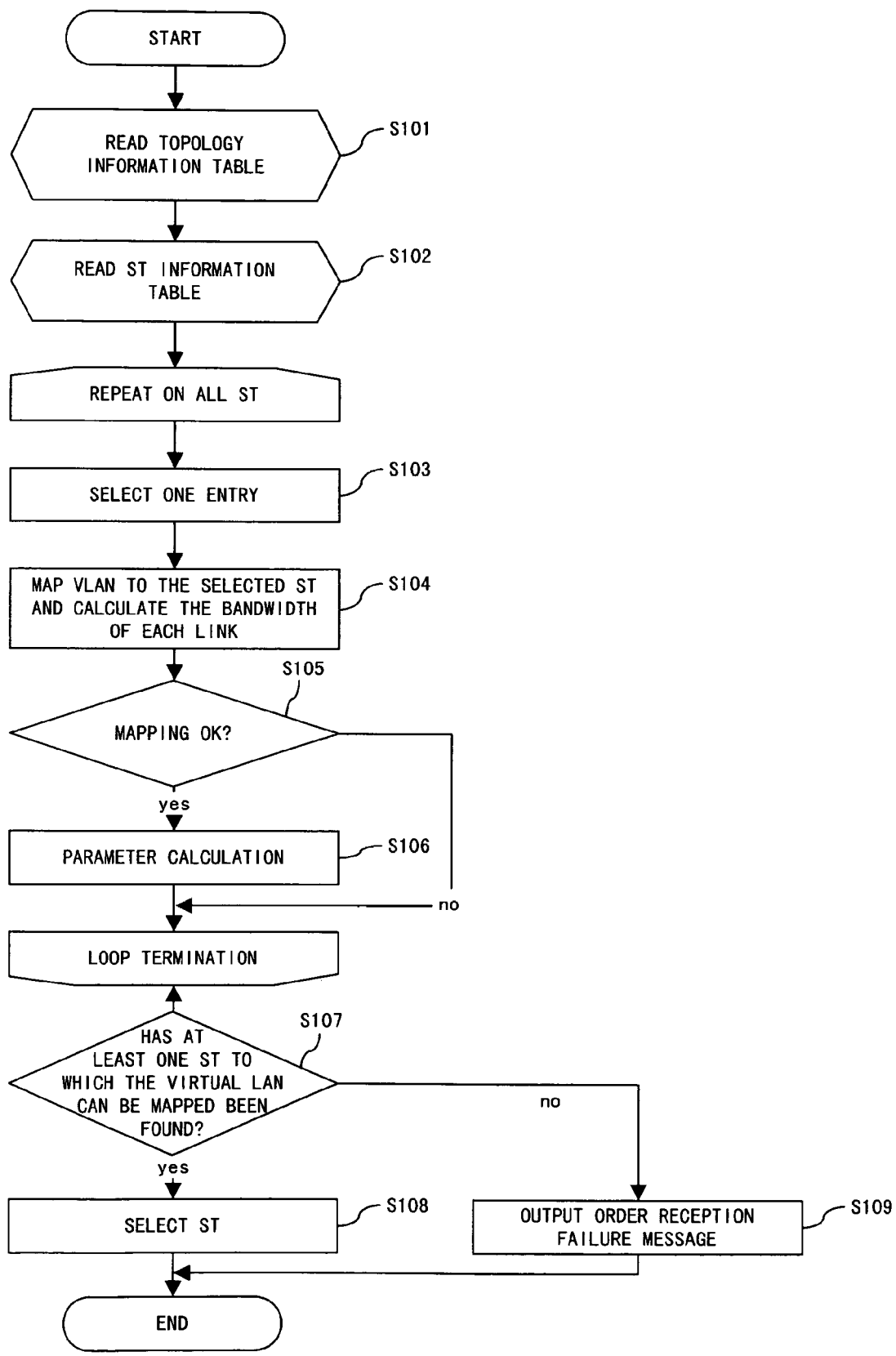
FIG. 35 is a flowchart showing the operations of the spanning tree selection unit according to the third to fifth embodiments.

FIG. 35 is a flowchart showing the operations of the spanning tree selection unit 14 in the third to fifth embodiments.

In step S101, topology information is obtained from the topology information table 11. In step S102, spanning tree information is obtained from the spanning tree information table 13. Then, the processes in steps S103 to 106 are performed for each of the spanning trees registered in the spanning tree information table 13.

In step S103, one spanning tree is extracted. In step S104, the bandwidth being used for each link, under the premise that the requested virtual LAN is mapped to the spanning tree extracted in step S103, is calculated. In step S105, whether or not the requested virtual LAN can be mapped to the spanning tree extracted in step S103 is determined. In other words, whether or not the bandwidth being used which was calculated in step S104 is less than the bandwidth of the corresponding link is determined. If the requested virtual LAN can be mapped, the parameter calculation process is performed in step S106. This parameter calculation process is explained later.

After the steps S103 to S106 are performed on all of the spanning trees, whether or not a spanning tree to which the requested virtual LAN can be mapped exists is checked in step S107. If such a spanning tree does exist, one spanning tree to which the virtual LAN should be mapped is selected in step S108. This selection process is explained later. On the other hand, if no such spanning tree exists, a message stating that the virtual LAN cannot be mapped is output.

FIG. 36A to FIG. 37C are diagrams which explain in detail the processes of step S106 and S108 shown in FIG. 35.

In the example shown in FIG. 36A, the total hop count is checked as the process in step S106, under the premise that the virtual LAN is mapped to a corresponding spanning tree. The total hop count is stored, in correspondence with the spanning tree identifier MSTID, which identifies this spanning tree. In addition, as the process in step S108, the spanning tree identifier MSTID, which identifies the spanning tree with the smallest total hop count is output, along with the message that the virtual LAN order has been accepted.

In the example shown in FIG. 36B, the amount of bandwidth increase is checked as the process in step S106, under the premise that the virtual LAN is mapped to a corresponding spanning tree. The bandwidth increase is stored, in correspondence with the spanning tree identifier MSTID, which identifies this spanning tree. In addition, as the process in step S108, the spanning tree identifier MSTID, which identifies the spanning tree with the smallest bandwidth increase is output, along with the message that the virtual LAN order has been accepted.

Figure 37A:
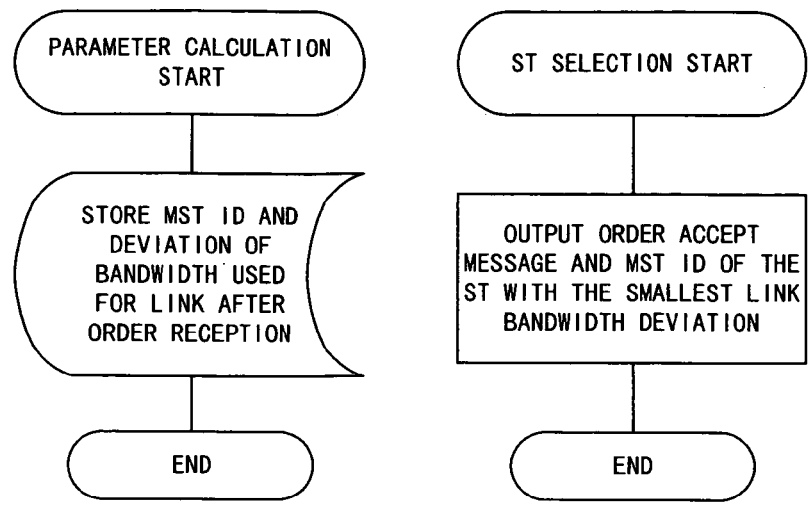

In the examples shown in FIG. 36C and FIG. 37A, the variation in link usage rates is checked as the process in step S106, under the premise that the virtual LAN is mapped to a corresponding spanning tree. The amount of variation is stored, in correspondence with the spanning tree identifier MSTID, which identifies this spanning tree. In addition, as the process in step S108, the spanning tree identifier MSTID, which identifies the spanning tree with the smallest variation is output, along with the message that the virtual LAN order has been accepted.

However, in the example shown in FIG. 36C, the link usage rate for each link is calculated based on the result of adding the declared bandwidth of the newly requested virtual LAN to the bandwidth already assigned to other virtual LANs. On the other hand, in the example shown in FIG. 37A, the bandwidth which is actually being used is measured, and the link usage rate for each link is calculated based on the result of adding the declared bandwidth of the newly requested virtual LAN to the measured bandwidth.

Figure 37B:
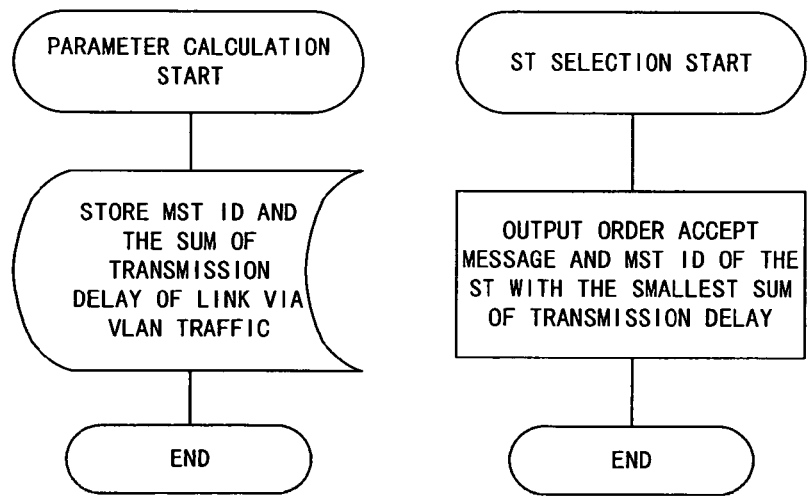

In the example shown in FIG. 37B, the sum of transmission delay time is checked as the process in step S106, under the premise that the virtual LAN is mapped to a corresponding spanning tree. The sum of transmission delay time is stored, in correspondence with the spanning tree identifier MSTID, which identifies this spanning tree. In addition, as the process in step S108, the spanning tree identifier MSTID, which identifies the spanning tree with the smallest sum of transmission delay time is output, along with the message that the virtual LAN order has been accepted.

Figure 37C:
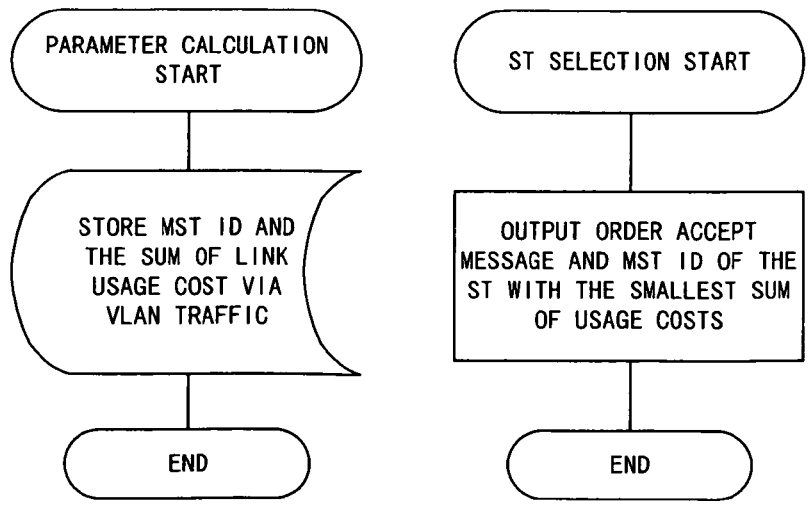

In the example shown in FIG. 37C, the sum of usage costs is checked as the process in step S106, under the premise that the virtual LAN is mapped to this spanning tree. The sum of usage costs is stored, in correspondence with the spanning tree identifier MSTID, which identifies a corresponding spanning tree. In addition, as the process in step S108, the spanning tree identifier MSTID, which identifies the spanning tree with the smallest sum of usage costs is output, along with the message that the virtual LAN order has been accepted.

<Simulation 1>

The network shown in FIG. 38A is used in this simulation. The cost of each link is the same. In addition, the virtual LAN which should be mapped is interconnected to a main office system and one or a plurality of branch-office systems. 10 Mbps is declared as the bandwidth for traffic from the main office system to each affiliate-office system, 5 Mbps as the bandwidth for the traffic from each branch-office system to the main office system, and 3 Mbps as the bandwidth between branch-office systems.

Comparisons of the method according to the present invention, the method according to prior art, and method implementing a single spanning tree will be made, under this environment. The "method according to the present invention" creates a plurality of spanning trees beforehand, selects an appropriate spanning tree out of the plurality of spanning trees when a virtual LAN order is received, and assigns the selected spanning tree to the virtual LAN order, as has been explained using FIG. 1 to FIG. 37. Here, the root node is selected randomly, and the spanning tree is selected so that the hop count of the virtual LAN is at minimum. In contrast, the "method according to prior art" creates a new spanning tree every time a virtual LAN order is received, and assigns this spanning tree to the virtual LAN order.

In FIG. 38B, the time from when the virtual LAN order is received from the user until the configurations for starting the virtual LAN services is completed is compared. Here, "access node" refers to a node which accommodates a user. For example, "number of access nodes=5" indicates that the main office system and four branch-office systems are accommodated in different nodes.

As is shown in FIG. 38B, in the "method according to prior art", the time required until service starts becomes drastically (exponentially) longer as the number of access nodes increases. In contrast, in the "method according to the present invention", the time required until service starts increases slowly, when the number of access node increases.

In FIG. 38C, the numbers of virtual LANs which can be mapped are compared. Here, the number of access nodes of each virtual LAN is "5". As is shown in FIG. 38C, the maximum number of virtual LANs which can be mapped in the method implementing a single spanning tree is approximately 500. In contrast, approximately 700 virtual LANs can be mapped in the method according to the present invention. When the numbers of virtual LANs which can be mapped are compared, the "method according to prior art" has a slight advantage over the "method according to the present invention" in this example. However, in the "method according to prior art", a problem occurs wherein the "time required until service starts" deteriorates rapidly when the number of mapped virtual LANs increase, as explained earlier.

In this way, the method according to the present invention actualizes the shortening of time until service starts and the increase in the number of virtual LANs which can be mapped, in a balanced manner.

<Simulation 2>

A first method and a second method according to the present invention are compared. Here, in the first method, the duplication of spanning trees is prevented by incrementing the link cost of a link every time the link is comprised in a spanning tree, when creating a plurality of spanning trees while randomly selecting the root node. In addition, in the sequence for selecting one spanning tree out of a plurality of spanning trees, the tree with the smallest total hop count is selected, in accordance to the fourth embodiment explained earlier.

On the other hand in the second method, the sequence for creating a plurality of spanning trees is in accordance to the second embodiment explained above. In other words, the plurality of spanning trees are created so that links which are not used even once do not exist, while taking into consideration the priority level of each link. In addition, the sequence for selecting one spanning tree out of the plurality of spanning trees is in accordance to the fifth embodiment explained above, and the tree with the least amount of variation in link usage rates is selected.

Although the network model which is the premise of simulation 2 is not particularly shown, it differs from the network premised in simulation 1 above.

FIG. 39 is a diagram showing the comparison results of the number of virtual LANs which can be mapped. Here, the number of spanning trees created beforehand is premised to be 16. Simulation results under "number of access nodes=5" and "number of access nodes=10" are shown in FIG. 39A and FIG. 39B, respectively.

As can be seen from these simulation results, the second method is advantageous when focusing on the number of virtual LANs which can be mapped. In other words, it can be said that communication resources (or bandwidth) are used more effectively in the second method. The reason for this is thought to lie in the fact that the localized increase in link usage rates can be suppressed because spanning trees which preferentially use links with a large bandwidth are provided beforehand. The "method for creating a plurality of spanning trees" and the "method for selecting one spanning tree out of a plurality of spanning trees" can be combined at one's discretion.

Figure 40:
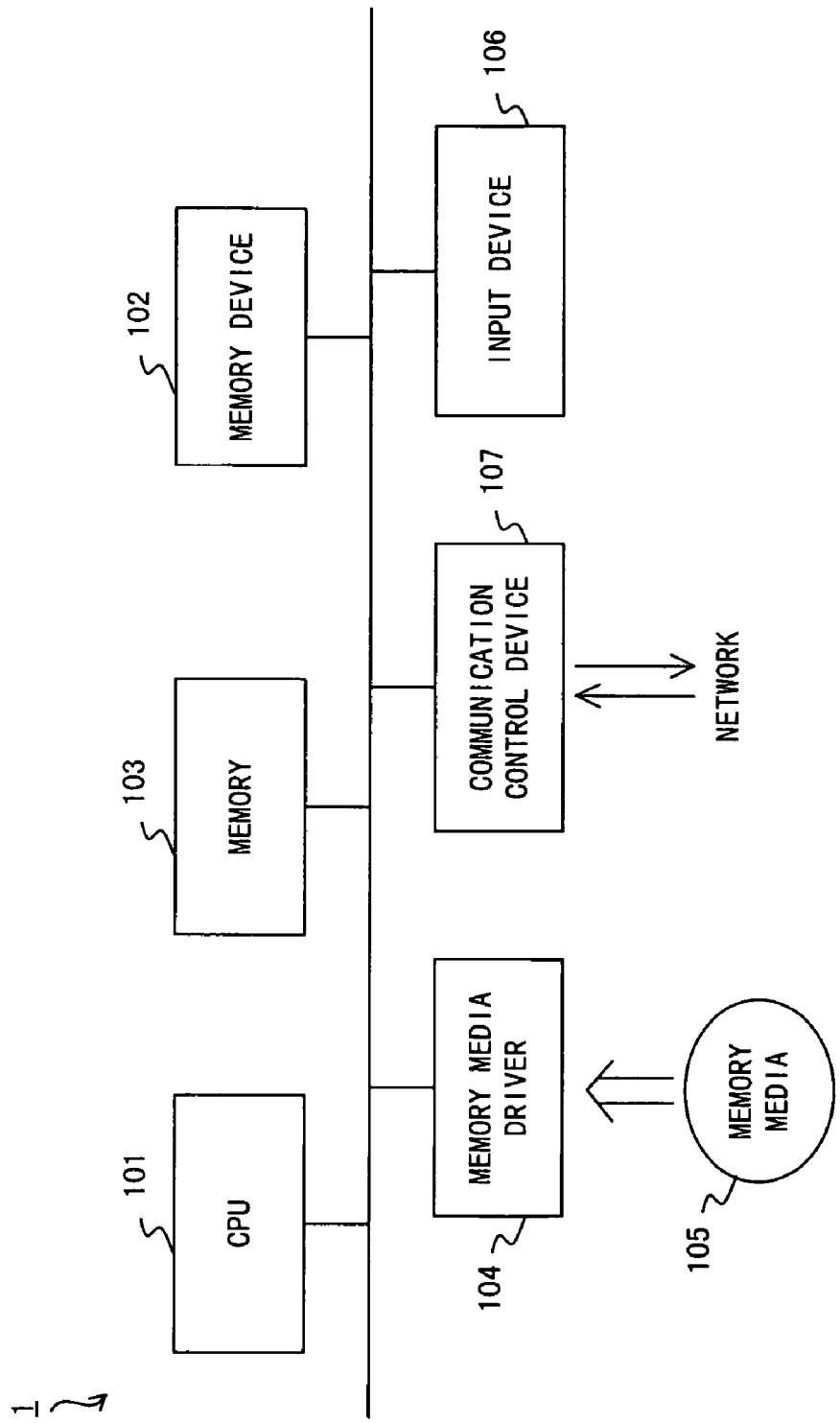
FIG. 40 is a hardware block diagram of a computer operating as the network administration system.

FIG. 40 is a hardware configuration diagram of the computer operating as the network administration system 1. The virtual LAN creation function is actualized by executing a program describing the processes in the flowchart above using a computer.

CPU 101 loads the programs stating the processes shown in the flowchart above from a memory device 102 to the memory 103 and executes the programs. The memory device 102 is, for example, a hard disk and stores the programs. The memory device 102 can be an external memory device which is connected to the computer 100. The memory 103 is, for example, a semiconductor memory and is used as the working area of CPU 101.

Memory media driver 104 accesses a memory media 105 according to instructions from the CPU 101. The memory media 105 comprises, for example, a semiconductor device (PC card and the like), a media wherein information is input/output by magnetic action (flexible disk, magnetic tape, and the like), and a media wherein information is input/output by optical action (optical disk and the like). Input device 106 is, for example, keyboard and pointing device and transmits input from the network administrator to the CPU 101. Communication control device 107 transmits and receives data via the network according to instructions from the CPU 101.

The topology information table 11 and the spanning tree information table 13 are, for example, stored in the memory device 12. In addition, the spanning tree creation unit 12, the spanning tree selection unit 14, the node setup unit 15, and the priority setting unit 16 is actualized by executing programs stating the processes in the flowchart above using the CPU 101. The node setup unit 15 sends instructions to each node via the communication control device 107.

According to the present invention, the time required from when virtual LAN service is requested until this service can commence is significantly shortened. In addition, virtual LAN can be provided by paths in adherence to the priority level of each link. Furthermore, the virtual LAN can be configured in reference to the communication parameter which should be taken into consideration. In particular, effective use of communication resources can be made when selecting the spanning tree by taking into consideration the variations of the link usage rates.

What is claimed is:

1. A virtual LAN creation device for creating a virtual LAN on a network wherein a plurality of nodes are connected, comprising:

a topology information storage unit for storing topology information which expresses the topology of the network;

a spanning tree creation unit for creating a plurality of spanning trees in reference to the topology information stored in said topology information storage unit, with the spanning tree creation unit counting a number of times each link has been used while the plurality of spanning trees are sequentially created;

a spanning tree information storage unit for storing spanning tree information which expresses each of the plurality of spanning trees created by said spanning tree creation unit;

a spanning tree selection unit for selecting a spanning tree corresponding to a requested virtual LAN, out of the plurality of spanning trees which are expressed by the spanning tree information stored in said spanning tree information storage unit;

a node setup unit for setting spanning tree information stored in said spanning tree information storage unit, and mapping information which expresses the correspondence between the spanning tree selected by said spanning tree selection unit and the requested virtual LAN, in the plurality of nodes; and a link priority setting unit for adding link priority level information, which expresses the priority level of each of the links between the plurality of nodes, to the topology information stored in said topology information storage unit, wherein said spanning tree creation unit creates the plurality of spanning trees in reference to the link priority information until all links are used at least once as elements comprising a spanning tree.

2. The virtual LAN creation device according to claim 1, wherein
said link priority setting unit adds the link priority level information for each of the links based on instructions from a network administrator.

3. The virtual LAN creation device according to claim 1, wherein
said link priority setting unit adds the link priority level information for each of the links based on the bandwidth of each link.

4. The virtual LAN creation device according to claim 1, wherein
said link priority setting unit adds the link priority level information for each of the links based on the transmission delay time of each link.

5. The virtual LAN creation device according to claim 1, wherein
said link priority setting unit adds the link priority level information for each of the links based on the usage cost of each link.

6. The virtual LAN creation device according to claim 1, wherein
said spanning tree creation unit creates a new spanning tree according to the number of times each of the links has been used as a part of previously created spanning tree, while creating the plurality of spanning trees one by one.

7. The virtual LAN creation device according to claim 1, wherein
said spanning tree creation unit creates the plurality of spanning trees so that each link is comprised in any of the spanning trees at least once.

8. The virtual LAN creation device according to claim 1, wherein said spanning tree creation unit comprise:
a first creation unit for creating one spanning tree which comprises a high-priority link;
a second creation unit for creating one or a plurality of spanning trees until all links are used at least once as elements comprising a spanning tree, after the spanning tree is created by said first creation unit; and
a third creation unit for creating spanning trees including a high-priority link, until total number of spanning trees reaches a predetermined number, after one or a plurality of spanning trees is created by said second creation unit.

9. The virtual LAN creation device according to claim 1, wherein
said spanning tree selection unit selects a spanning tree with the smallest total hop count when the requested virtual LAN is mapped.

10. The virtual LAN creation device according to claim 1, wherein
said spanning tree selection unit selects a spanning tree with a smallest sum of bandwidths which should be newly assigned to each link when the requested virtual LAN is mapped.

11. The virtual LAN creation device according to claim 1, wherein
said spanning tree selection unit selects a spanning tree with a smallest variation in a link usage rate of an entire network when the requested virtual LAN is mapped.

12. The virtual LAN creation device according to claim 10, wherein
said spanning tree selection unit calculates a link usage rate based on the sum of the bandwidths of each link requested by the virtual LAN and the bandwidths already assigned to each link.

13. The virtual LAN creation device according to claim 10, wherein
said spanning tree selection unit calculates a link usage rate based on the sum of the bandwidths of each link requested by the virtual LAN and the bandwidth actually being used in each link.

14. The virtual LAN creation device according to claim 1, wherein
said spanning tree selection unit selects a spanning tree with the smallest sum of transmission delay time of the paths through which virtual LAN traffic flows when the requested virtual LAN is mapped.

15. The virtual LAN creation device according to claim 1, wherein
said spanning tree selection unit selects a spanning tree with the smallest sum of usage costs of the paths through which virtual LAN traffic flows when the requested virtual LAN is mapped.

16. The virtual LAN creation device according to claim 9, wherein
said spanning tree selection unit selects a spanning tree to which the requested virtual LAN can be mapped.

17. A virtual LAN creation device for creating a virtual LAN on a network wherein a plurality of nodes are connected, comprising:
a spanning tree creation unit for creating a plurality of spanning trees based on a topology of the network, with the spanning tree creation unit counting a number of times each link has been used while the plurality of spanning trees are sequentially created;
a spanning tree information storage unit to which the plurality of spanning trees created by said spanning tree creation unit being registered;
a spanning tree selection unit for selecting a spanning tree corresponding to a requested virtual LAN, out of the plurality of spanning trees registered to said spanning tree information storage unit;
a node setup unit for setting mapping information which expresses the correspondence between a spanning tree selected by said spanning tree selection unit and the requested virtual LAN, in the plurality of nodes; and
a link priority setting unit for setting link priority level information, which expresses the priority level of each of the links between the plurality of nodes, wherein
said spanning tree creation unit creates the plurality of spanning trees in reference to the link priority information until all links are used at least once as elements comprising a spanning tree.

18. A virtual LAN creation method for creating a virtual LAN on a network wherein a plurality of nodes are connected, comprising:
creating a plurality of spanning trees based on a topology of the network, with counting a number of times each link has been used while the plurality of spanning trees are sequentially created;
registering the plurality of spanning trees to a memory device;
selecting a spanning tree corresponding to a requested virtual LAN out of the plurality of spanning trees registered in the memory device;
setting mapping information which expresses the correspondence between the selected spanning tree and the requested virtual LAN in the plurality of nodes; and
setting link priority level information, which expresses the priority level of each of the links between the plurality of nodes, wherein the plurality of spanning trees are created in reference to the link priority information until all links are used at least once as elements comprising a spanning tree.

19. A network system for providing virtual LAN services, comprising:
- a plurality of nodes which comprise the network;
- a spanning tree creation unit for creating a plurality of spanning trees based on a topology of the network, with the spanning tree creation unit counting a number of times each link has been used while the plurality of spanning trees are sequentially created;
- a spanning tree information storage unit to which the plurality of spanning trees created by the spanning tree creation unit are registered;
- a spanning tree selection unit for selecting a spanning tree corresponding to a requested virtual LAN, out of the plurality of spanning trees registered in said spanning tree information storage unit;
- a node setup unit for setting mapping information which expresses the correspondence between the spanning tree selected by said spanning tree selection unit and the requested virtual LAN, in the plurality of nodes; and
- a link priority setting unit for setting link priority level information, which expresses the priority level of each of the links between the plurality of nodes, wherein
said spanning tree creation unit creates the plurality of spanning trees in reference to the link priority information until all links are used at least once as elements comprising a spanning tree.

* * * * *